(12) United States Patent
Zuo et al.

(10) Patent No.: US 12,506,350 B2
(45) Date of Patent: *Dec. 23, 2025

(54) CHARGING AND DISCHARGING APPARATUS AND BATTERY CHARGING METHOD

(71) Applicant: CONTEMPORARY AMPEREX TECHNOLOGY (HONG KONG) LIMITED, Hong Kong (CN)

(72) Inventors: Xiyang Zuo, Ningde (CN); Yu Yan, Ningde (CN); Jinfeng Gao, Ningde (CN); Diping Liu, Ningde (CN); Zhanliang Li, Ningde (CN); Yizhen Hou, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 825 days.

This patent is subject to a terminal disclaimer.

(21) Appl. No.: 17/715,166

(22) Filed: Apr. 7, 2022

(65) Prior Publication Data

US 2023/0029492 A1 Feb. 2, 2023

Related U.S. Application Data

(63) Continuation of application No. PCT/CN2021/109121, filed on Jul. 29, 2021.

(51) Int. Cl.
*H02J 7/00* (2006.01)
*H01M 10/42* (2006.01)
(Continued)

(52) U.S. Cl.
CPC ............ *H02J 7/00712* (2020.01); *H02J 3/28* (2013.01); *H02J 7/0048* (2020.01);
(Continued)

(58) Field of Classification Search
CPC ........ H02J 7/00712; H02J 3/28; H02J 7/0048; H02J 7/00714; H02J 7/02; H02J 7/007182;
(Continued)

(56) References Cited

U.S. PATENT DOCUMENTS 10,333,319 B2   6/2019   Sepe, Jr. et al.
10,926,644 B1*  2/2021   Willson ................ H02J 7/342
(Continued)

FOREIGN PATENT DOCUMENTS

CN   103312001 A   9/2013
CN   103580250 A   2/2014
(Continued)

OTHER PUBLICATIONS

Extended European Search Report dated Dec. 5, 2022 received in European Patent Application No. EP 21865318.6.
(Continued)

*Primary Examiner* — Jul
*Assistant Examiner* — John P Ondrasik
(74) *Attorney, Agent, or Firm* — Scully, Scott, Murphy & Presser, P.C.

(57) ABSTRACT

Embodiments of the present application provide a charging and discharging apparatus and a battery charging method, which are capable of ensuring security performance of a battery. The apparatus comprises a bi-directional DC/DC converter and a control unit, wherein the control unit is configured to: receive a first charging current transmitted by a battery management system (BMS) of a battery, control the bi-directional DC/DC converter based on the first charging current to charge the battery through an energy storage battery; receive a first discharging current transmitted by the BMS and control the bi-directional DC/DC converter based on the first discharging current to discharge a battery capac-
(Continued)

ity of the battery to the energy storage battery; and receive a second charging current transmitted by the BMS and control the bi-directional DC/DC converter based on the second charging current to charge the battery through the energy storage battery.

18 Claims, 15 Drawing Sheets

(51) Int. Cl.
  *H02J 3/28*     (2006.01)
  *H02J 7/02*     (2016.01)
  *H02J 7/34*     (2006.01)

(52) U.S. Cl.
  CPC ............ *H02J 7/00714* (2020.01); *H02J 7/02* (2013.01); *H01M 2010/4271* (2013.01); *H02J 7/007182* (2020.01); *H02J 7/342* (2020.01); *H02J 2207/20* (2020.01); *H02J 2310/48* (2020.01)

(58) Field of Classification Search
  CPC .... H02J 7/342; H02J 2207/20; H02J 2310/48; H01M 2010/4271
  USPC ....................................... 320/144, 3
  See application file for complete search history.

(56) References Cited

U.S. PATENT DOCUMENTS

| | | | | |
|---|---|---|---|---|
| 2008/0238356 | A1* | 10/2008 | Batson | H02J 7/04 320/103 |
| 2012/0206104 | A1* | 8/2012 | Tsuchiya | B60L 55/00 320/128 |
| 2012/0249078 | A1* | 10/2012 | Kim | H02J 3/32 320/128 |
| 2013/0054069 | A1* | 2/2013 | Komiya | B60L 58/18 701/22 |
| 2013/0342011 | A1* | 12/2013 | Robinson | H02J 5/00 307/12 |
| 2014/0091748 | A1* | 4/2014 | Hermann | H02J 7/00 320/130 |
| 2014/0093760 | A1 | 4/2014 | Hermann et al. | |
| 2015/0298568 | A1* | 10/2015 | Mitsutani | B60L 58/13 180/65.21 |
| 2017/0106764 | A1* | 4/2017 | Beaston | B60L 58/12 |
| 2017/0229902 | A1* | 8/2017 | Kamikawa | H01M 10/441 |
| 2018/0166892 | A1 | 6/2018 | Sepe, Jr. et al. | |
| 2018/0226823 | A1* | 8/2018 | Ashcraft | H02J 7/1423 |
| 2019/0305333 | A1 | 10/2019 | Sato et al. | |
| 2019/0356012 | A1 | 11/2019 | Hermann | |
| 2020/0014055 | A1 | 1/2020 | Hermann | |
| 2020/0161696 | A1 | 5/2020 | Hermann et al. | |
| 2020/0290472 | A1 | 9/2020 | Heyne et al. | |
| 2021/0070185 | A1* | 3/2021 | Liu | B60L 53/51 |
| 2022/0118880 | A1 | 4/2022 | Hermann et al. | |

FOREIGN PATENT DOCUMENTS

| | | |
|---|---|---|
| CN | 203658549 U | 6/2014 |
| CN | 106059024 A | 10/2016 |
| CN | 108110349 A | 6/2018 |
| CN | 108599212 A | 9/2018 |
| CN | 210294492 U | 4/2020 |
| CN | 111381171 A | 7/2020 |
| JP | 2004165101 A | 6/2004 |
| JP | 2011130647 A | 6/2011 |
| JP | 2014147197 A | 8/2014 |
| JP | 2014158415 A | 8/2014 |
| JP | 2014195397 A | 10/2014 |
| JP | 2017085888 A | 5/2017 |
| JP | 2018182948 A | 11/2018 |
| JP | 2020053287 A | 4/2020 |
| JP | 2021093788 A | 6/2021 |
| JP | 2021111488 A | 8/2021 |
| JP | 2022116990 A | 8/2022 |
| KR | 20150108825 A | 9/2015 |
| WO | 2013093753 A1 | 3/2013 |
| WO | 2019193195 A1 | 10/2019 |
| WO | 2020161767 A1 | 8/2020 |

OTHER PUBLICATIONS

Notice of Reasons for Refusal dated Oct. 16, 2023 received in Japanese Patent Application No. JP 2021-576103.
Request for the Submission of an Opinion dated Aug. 14, 2023 received in Korean Patent Application No. KR 10-2021-7040431.

* cited by examiner

CHARGING AND DISCHARGING APPARATUS AND BATTERY CHARGING METHOD

CROSS-REFERENCE TO RELATED APPLICATIONS

This application is a continuation of International Application No. PCT/CN2021/109121, filed on Jul. 29, 2021, the disclosure of which is hereby incorporated by reference in its entirety.

TECHNICAL FIELD

The present application relates to the field of batteries and in particular, relates to a charging and discharging apparatus and a battery charging method.

BACKGROUND

With the development of the times, an electric automobile has a huge market prospect and can effectively facilitate energy saving and emission reduction due to its highly environmental-protection feature, low noise, low using cost and other advantages, thereby creating advantages for social development and progress.

For the field of the electric automobile and its related fields, a battery technique is a vital factor relating to its development. In particular, security performance of a battery affects development and application of battery-related products and degree of acceptance of the electric automobile by the general public. Therefore, how to ensure security performance of the battery is a technical problem to be solved.

SUMMARY

Embodiments of the present application provide a charging and discharging apparatus and a battery charging method, which are capable of ensuring security performance of a battery.

A first aspect provides a charging and discharging apparatus, the apparatus comprising a bi-directional DC/DC converter and a control unit; where the control unit is configured to: receive a first charging current transmitted by a battery management system (BMS) of a battery and control the bi-directional DC/DC converter based on the first charging current to charge the battery through an energy storage battery; receive a first discharging current transmitted by the BMS and control the bi-directional DC/DC converter based on the first discharging current to discharge a battery capacity of the battery to the energy storage battery, where the first discharging current is a discharging current transmitted by the BMS when a first accumulative charging amount of the battery is greater than or equal to a first accumulative charging amount threshold and a voltage of a battery cell of the battery does not exceed a full-charging voltage of the battery cell; and receive a second charging current transmitted by the BMS and control the bi-directional DC/DC converter based on the second charging current to charge the battery through the energy storage battery, where the second charging current is a charging current transmitted by the BMS when a first accumulative discharging amount of the battery is greater than or equal to a first accumulative discharging amount threshold.

Through the technical solution in embodiments of the present application, a charging method realizable between a charging and discharging apparatus and a BMS is provided. In a process of charging a battery, the charging and discharging apparatus can realize charging and discharging of the battery based on a first charging current and a first discharging current transmitted by the BMS. Thus, heating, lithium-ion clustering and other problems caused by continuous charging of the battery can be avoided. Thereby, security problems of the battery caused by heating, lithium-ion clustering and other problems can be avoided, such as combustion or explosion of the battery, so as to ensure security performance of the battery. Moreover, by charging and discharging the battery through the energy storage battery, requirements for fast charging of the battery on different occasions can be satisfied.

In some embodiments, the control unit is further configured to: receive a second discharging current transmitted by the BMS and controlling the bi-directional DC/DC converter based on the second discharging current to discharge the battery capacity of the battery to the energy storage battery, where the second discharging current is a discharging current transmitted by the BMS when a second accumulative charging amount of the battery is greater than or equal to a second accumulative charging amount threshold and a voltage of a battery cell of the battery does not exceed a full-charging voltage of the battery cell.

Through the technical solution of the implementation, after completing charging, discharging and recharging of the battery through information interaction between the BMS and the charging and discharging apparatus, the battery can be further re-discharged. According to the manner, embodiments of the present application can further provide a charging and discharging method circulating multiple times, which is performed in order circularly in a charging and discharging process, to realize step-by-step charging of the battery on the basis of ensuring performance of the battery.

In some embodiments, the control unit is further configured to: determine according to the first discharging current that a discharging demand power of the battery is smaller than a discharging power threshold; and control the bi-directional DC/DC converter to discharge the battery capacity of the battery to the energy storage battery.

By discharging the battery capacity of the battery to an echelon battery, on one hand, a discharging process can be increased, lithium ion clustering can be removed and a charging speed can be increased in a charging process of the battery. On the other hand, the echelon battery can be charged, thereby avoiding energy waste.

In some embodiments, the control unit is further configured to: determine according to the first discharging current that a discharging demand power of the battery is greater than or equal to a discharging power threshold; and control the bi-directional DC/DC converter to discharge a battery capacity of a first discharging demand power to the energy storage battery and control the bi-directional DC/DC converter to discharge a battery capacity of a second discharging demand power to a power grid through a second charging and discharging apparatus, where the sum of the first discharging demand power and the second discharging demand power is equal to the discharging demand power.

In embodiments of the present application, when a discharging power of the battery exceeds a discharging power threshold of the echelon battery, the charging and discharging apparatus can discharge a part of the battery capacity to the power grid, thus ensuring security of the echelon battery while realizing discharging in a charging process.

In some embodiments, the control unit is further configured to: obtain a state of charge (SOC) of the energy storage battery; and determine that the SOC is greater than or equal to a SOC threshold and control the bi-directional DC/DC converter based on the first charging current to charge the battery through the energy storage battery.

Before the charging and discharging apparatus in embodiments of the present application charges the battery, the SOC of the energy storage battery can be firstly judged and the energy storage battery is only used to charge the battery when the battery capacity of the energy storage battery is sufficient.

In some embodiments, the control unit is further configured to: obtain a state of charge (SOC) of the energy storage battery; and the control unit is specifically configured to: determine that the SOC is smaller than a SOC threshold; transmit a charging request message to the second charging and discharging apparatus to enable the second charging and discharging apparatus to charge the energy storage battery through the power grid; and determine that the SOC is greater than or equal to the SOC threshold and control the bi-directional DC/DC converter based on the first charging current to charge the battery through the energy storage battery.

When the battery capacity of the energy storage battery is insufficient, the charging and discharging apparatus in embodiments of the present application can enable the power grid to charge the echelon battery by transmitting a charging request message, and when the battery capacity of the echelon battery is sufficient, the echelon battery is used again to charge the battery, thus improving charging efficiency.

In some embodiments, the control unit is further configured to: receive a charging stop command transmitted by the BMS and stop charging the battery, where the charging stop command is a command transmitted by the BMS when a voltage of a battery cell of the battery exceeds a full-charging voltage of the battery cell.

The charging and discharging apparatus in embodiments of the present application can timely adjust switch of the charging and discharging process for the battery according to real-time requirements of the BMS and determine whether to charge the battery continuously, thus improving charging efficiency.

In some embodiments, a charging rate of the first charging current and/or the second charging current ranges between 2C and 10C.

Through the technical solution of the implementation, on the basis of ensuring security performance of the battery, a charging rate of the first charging current and/or the second charging current ranges between 2C and 10C, in which case fast charging with a high current can be realized to increase a charging amount of the battery in a single charging process and realize the purpose of fast charging.

In addition, restricted by lithium ion clustering at cathode in a continuous charging process, the charging current is also restricted. Thus, a continuous high current cannot be used to realize fast charging of the battery. However, in the technical solution of embodiments of the present application, the high current is configured to charge the battery and after a charging with the high current, the battery is discharged to release lithium ions clustered to cathode of the battery in a charging process. Further subsequently, the high current can be used again to charge the battery to realize fast charging of the battery.

In some embodiments, a discharging rate of the first discharging current ranges between 0.1C and 1C.

Through the technical solution of the implementation, a discharging rate of the first discharging current ranges between 0.1C and 1C, to realize discharging with a low current, aiming to release lithium ion clustered at cathode of the battery through discharging of the battery with the low current, without causing excessive loss of the battery capacity that has been charged in the battery.

In some embodiments, a ratio of the first accumulative discharging amount threshold to the first accumulative charging amount threshold is smaller than or equal to 10%.

Through the technical solution of the implementation, setting the ratio of the accumulative discharging amount threshold in the discharging process to the accumulative charging amount threshold in the charging process can control the charging amount of the battery in the charging process and the discharging amount of the battery in the discharging process better, making the discharging amount small, without causing excessive loss of the battery capacity that has been charged in the battery.

In some embodiments, at least one of the first charging current, the first discharging current and the second charging current is determined and obtained by the BMS according to a state parameter of the battery; where the state parameter of the battery includes at least one of a battery temperature, a battery voltage, a battery current, a state of charge of the battery and a battery health state.

Through the technical solution of the implementation, at least one of the first charging current, the second charging current and the first discharging current is a current determined according to the state parameter of the battery, thereby adapting to the present state parameter of the battery better and improving charging efficiency and/or discharging efficiency of the battery, without causing any damage effect on the battery.

In some embodiments, the control unit is specifically configured to: regularly receive the first charging current transmitted by the BMS; and/or regularly receive the first discharging current transmitted by the BMS; and/or regularly receive the second charging current transmitted by the BMS.

In the implementation, in the process for the charging and discharging apparatus to charge once and/or discharge once the battery, the charging current and/or the discharging current is regularly transmitted by the BMS. On one hand, through the implementation, the charging current and/or the discharging current can be adjusted regularly to improve charging and discharging efficiencies. On the other hand, normal state of the BMS and the battery can be represented through the charging current and/or the discharging current transmitted regularly, facilitating the charging and discharging apparatus to continue to charge the battery or control discharging of the battery to ensure security performance of the battery.

In some embodiments, the control unit is further configured to: receive a first charging voltage transmitted by the BMS, where the first charging voltage and the first charging current are carried in a first battery charging demand message; and/or receive a first discharging voltage transmitted by the BMS, where the first discharging voltage and the first discharging current are carried in a second battery charging demand message; and/or receive a second charging voltage transmitted by the BMS, where the second charging voltage and the second charging current are carried in a third battery charging demand message.

In the implementation, the communication between the BMS and the charging and discharging apparatus is compatible with the communication protocol between the existing charging pile and the BMS. Thus, the communication between the BMS and charging and discharging apparatus is convenient to be implemented, thereby possessing a favorable application prospect.

A second aspect provides a battery charging method, the method being applied to a charging and discharging apparatus. The method includes: receiving, by the charging and discharging apparatus, a first charging current transmitted by a battery management system (BMS) of a battery and controlling the bi-directional DC/DC converter of the charging and discharging apparatus based on the first charging current to charge the battery through an energy storage battery; receiving, by the charging and discharging apparatus, a first discharging current transmitted by the BMS and controlling the bi-directional DC/DC converter based on the first discharging current to discharge a battery capacity of the battery to the energy storage battery, where the first discharging current is a discharging current transmitted by the BMS when a first accumulative charging amount of the battery is greater than or equal to a first accumulative charging amount threshold and a voltage of a battery cell of the battery does not exceed a full-charging voltage of the battery cell; and receiving, by the charging and discharging apparatus, a second charging current transmitted by the BMS and controlling the bi-directional DC/DC converter based on the second charging current to charge the battery through the energy storage battery, where the second charging current is a charging current transmitted by the BMS when a first accumulative discharging amount of the battery is greater than or equal to a first accumulative discharging amount threshold.

A third aspect provides a battery management system (BMS), comprising an obtaining unit configured to obtain a first charging current, a transmitting unit configured to transmit the first charging current to a charging and discharging apparatus to enable the charging and discharging apparatus to charge the battery based on the first charging current, and a processing unit configured to determine that the obtaining unit is further configured to obtain a first discharging current when a first accumulative charging amount of the battery is greater than or equal to a first accumulative charging amount threshold and a voltage of a battery cell of the battery does not exceed a full-charging voltage of the battery cell. The transmitting unit is further configured to transmit the first discharging current to the charging and discharging apparatus to enable the charging and discharging apparatus to control discharging of the battery based on the first discharging current. The processing unit is further configured to determine that the obtaining unit is further configured to obtain a second charging current when a first accumulative discharging amount of the battery is greater than or equal to a first accumulative discharging amount threshold. The transmitting unit is further configured to transmit the second charging current to the charging and discharging apparatus to enable the charging and discharging apparatus to charge the battery based on the second charging current.

A fourth aspect provides a battery charging method, comprising: obtaining a first charging current by a battery management system (BMS) and transmitting the first charging current to a charging and discharging apparatus to enable the charging and discharging apparatus to charge a battery based on the first charging current; if a first accumulative charging amount of the battery is greater than or equal to a first accumulative charging amount threshold and a voltage of a battery cell of the battery does not exceed a full-charging voltage of the battery cell, obtaining a first discharging current by the BMS and transmitting the first discharging current to the charging and discharging apparatus to enable the charging and discharging apparatus to control discharging of the battery based on the first discharging current; and if a first accumulative discharging amount of the battery is greater than or equal to a first accumulative discharging amount threshold, obtaining a second charging current by the BMS and transmitting the second charging current to the charging and discharging apparatus to enable the charging and discharging apparatus to charge the battery based on the second charging current.

A fifth aspect provides a charging and discharging apparatus, comprising a processor and a memory, where the memory is configured to store a computer program, and the processor is configured to call the computer program to perform the method in the second aspect and any one of the possible implementations of the second aspect.

A sixth aspect provides a battery management system (BMS), comprising a processor and a memory, where the memory is configured to store a computer program, and the processor is configured to call the computer program to perform the method in the fourth aspect and any one of the possible implementations of the fourth aspect.

BRIEF DESCRIPTION OF DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following further describes the implementations of the present application in detail with reference to the accompanying drawings and embodiments. Detailed description of the following embodiments and accompanying drawings are used to illustratively state the principles of the present application, but not to limit the scope of the present application, that is, the present application is not limited to the embodiments described.

In the descriptions of the present application, it should be noted that unless otherwise described additionally, "plural" means more than two; and the orientations or positional relationships indicated by the terms "up", "down", "left", "right", "inside", "outside", and the like are merely intended to facilitate the descriptions of the present application and simplify the descriptions, but not intended to indicate or imply that the apparatuses or components mentioned must have specific orientations, or be constructed and operated for a specific orientation, and therefore shall not be understood as a limitation to the present application. In addition, the terms "first", "second" and "third" etc. are merely intended for a purpose of description, and shall not be understood as an indication or implication of relative importance.

In the field of new energy, a power battery can serve as a main power source of an electric apparatus (for example, a vehicle, a ship or a spacecraft) and an energy storage battery can serve as a source for charging of the electric apparatus. Therefore, importance of the power battery and the energy storage battery are self-evident. Illustratively rather than restrictively, in some application scenes, the power battery can be a battery in the electric apparatus and the energy storage battery can be a battery in the charging apparatus. To facilitate descriptions, the power battery and the energy storage battery can be known as a battery in general in the following text.

At present, batteries of market are mostly chargeable storage batteries, of which a lithium battery is the most commonly seen one, such as a lithium-ion battery or a lithium-ion polymer battery etc. In a charging process, a manner of continuous charging is generally employed for charging the battery. However, continuous charging of the battery will cause occurrence of lithium plating, heating and other phenomenon to the battery, where lithium plating, heating and other phenomenon not only degrade performance of the battery and greatly shorten the circular service life, but also restrict the fast charging capacity of the battery. Moreover, combustion, explosion and other disastrous consequences are likely caused, resulting in serious security problem.

In order to ensure security performance of the battery, the present application proposes a new battery charging method and a charging system.

Figure 1:
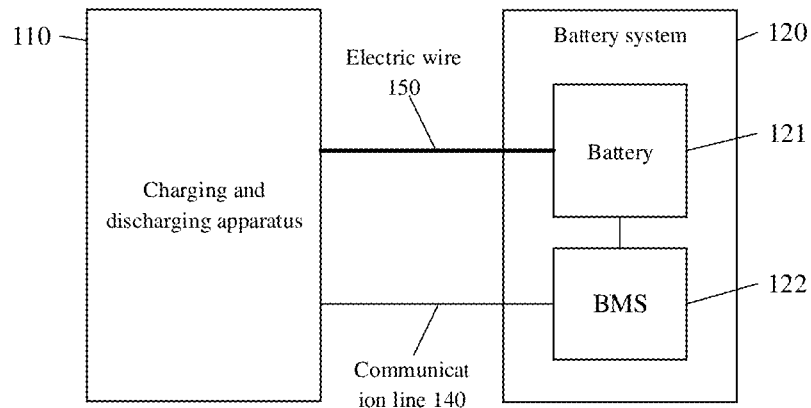
FIG. 1 is an architecture diagram of a charging system applicable in one embodiment of the present application.

FIG. 1 shows an architecture diagram of a charging system applicable in embodiments of the present application.

As shown in FIG. 1, the charging system 100 can include a charging and discharging apparatus 110 and a battery system 120. Optionally, the battery system 120 can be a battery system in an electric automobile (comprising a pure electric automobile and an electricity-insertable hybrid power electric automobile) or a battery system in other application scenes.

Optionally, at least one battery pack can be disposed in the battery system 120 and the at least one battery pack is known as a battery 121 in general. Regarding types of the battery, the battery 121 can be any type of batteries, including but not limited to a lithium-ion battery, a lithium-metal battery, a lithium-sulfur battery, a lead-acid battery, a nickel-cadmium battery, a nickel-hydrogen battery, or a lithium-air battery etc. Regarding scale of the battery, the battery 121 in embodiments of the present application can be a core/a battery cell and can also be a battery module or a battery pack. The battery module or the battery pack can be formed by connecting a plurality of battery strings in series. The specific types and scale of the battery 121 are not limited in embodiments of the present application.

In addition, for smart management and maintenance of the battery 121, preventing over-charging and over-discharging of the battery and extending service life of the battery, a battery management system (BMS) 122 is further disposed generally in the battery system 120 for monitoring a state of the battery 121. Optionally, the BMS 122 can be integrated in one same device/apparatus with the battery 121; or the BMS 122 can also be disposed outside the battery 121 as a separate device/apparatus.

Specifically, the charging and discharging apparatus 110 is an apparatus for supplementing electrical energy for the battery 121 and/or controlling discharging of the battery 121 in the battery system 120.

Optionally, the charging and discharging apparatus 110 in embodiments of the present application can be an ordinary charging pile, a super charging pile and a charging pile that supports a vehicle to grid (V2G) mode, or can be a charging and discharging apparatus/device that can charge and/or discharge the battery etc. The specific types and specific application scenes of the charging and discharging apparatus 110 are not limited in embodiments of the present application.

Optionally, as shown in FIG. 1, the charging and discharging apparatus 110 can be connected to the battery 121 through an electric wire 150 and to the BMS 122 through a communication line 140, where the communication line 140 is configured to realize information interaction between the charging and discharging apparatus 110 and the BMS.

As an example, the communication line 140 includes but is not limited to a control area network (CAN) communication bus or a daisy chain communication bus.

Optionally, the charging and discharging apparatus 110 can also communicate with the BMS 122 through a wireless network in addition to communication with the BMS 122 through the communication line 140. Embodiments of the present application do not make any specific limitation to wired communication types or wireless communication types of the charging and discharging apparatus and the BMS 122.

Figure 2:
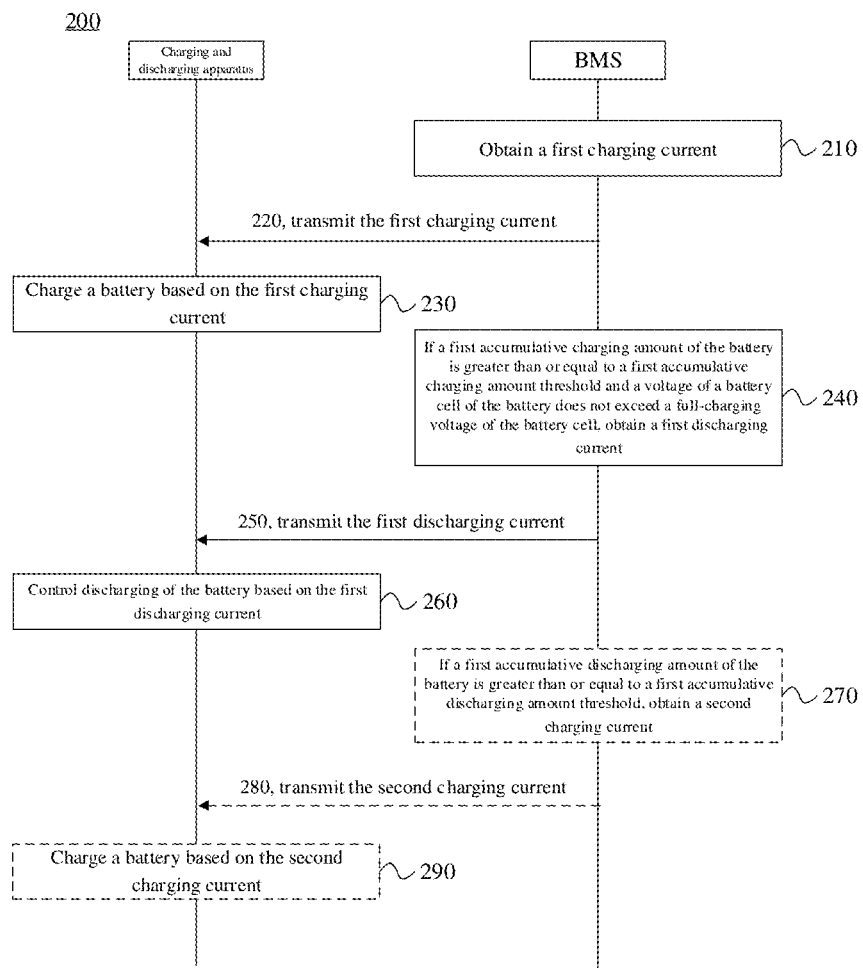
FIG. 2 is a schematic flowchart block diagram of a battery charging method provided by embodiments of the present application.

FIG. 2 shows a schematic flowchart block diagram of a battery charging method 200 applicable by embodiments of the present application. Optionally, the method 200 in embodiments of the present application is applicable to the charging and discharging apparatus 110 and the battery system 120 shown in FIG. 1.

As shown in FIG. 2, the battery charging method 200 can include the following steps:

step 210: obtaining a first charging current by a battery management system (BMS);

step 220: transmitting the first charging current to a charging and discharging apparatus by the BMS;

step 230: receiving, by the charging and discharging apparatus, a first charging current and charging a battery based on the first charging current;

step 240: if a first accumulative charging amount of the battery is greater than or equal to a first accumulative charging amount threshold and a voltage of a battery cell of the battery does not exceed a full-charging voltage of the battery cell, obtaining a first discharging current by the BMS;

step 250: transmitting the first discharging current to the charging and discharging apparatus by the BMS; and step 260: receiving, by the charging and discharging apparatus, a first discharging current and controlling discharging of the battery based on the first discharging current.

In embodiments of the present application, a charging method realizable between a charging and discharging apparatus and a BMS is provided. In a process of charging a battery, the charging and discharging apparatus can realize charging and discharging of the battery based on a first charging current and a first discharging current transmitted by the BMS, thereby preventing continuous charging of the battery to further prevent heating, lithium ion clustering and other problems caused by continuous charging of the battery. Since heating causes the temperature of the battery to rise, a crystal generated by lithium ion clustering is likely to pierce the battery, causing leakage of an electrolytic solution and a short circuit of the battery. Rising temperature of the battery, the short circuit of the battery and the like are likely to cause security problem of the battery, such as causing combustion or explosion etc. of the battery. Therefore, through the technical solution of embodiments of the present application, the charging and discharging apparatus realizes charging and discharging of the battery based on a first charging current and a first discharging current transmitted by the BMS to ensure security performance of the battery. In addition, in a continuous charging process, continuous clustering of lithium ions also causes lithium plating problems, affecting service life and charging ability of the battery. Therefore, through the technical solution in embodiments of the present application, service life and charging capacity of the battery can also be ensured.

Specifically, in step 210 to step 230, the BMS can firstly enter a charging mode to control the charging and discharging apparatus to charge the battery. Firstly, the BMS obtains a first charging current. After the BMS transmits the first charging current to the charging and discharging apparatus, the charging and discharging apparatus charges the battery based on the received first charging current.

Optionally, the BMS can obtain the first charging current from its own functional units (for example, a storage unit or a processing unit), or the BMS can also obtain the first charging current from other apparatus. In some implementations, the first charging current can be a preset current, where the preset current can be of a fixed value or can also change with time according to a preset manner. Alternatively, in some other implementations, the first charging current can also be a current determined according to the state parameter of the battery, and the first charging current changes with a change in the state parameter of the battery.

Optionally, the charging and discharging apparatus can be connected to a power source, and the power source can be an AC power source and/or a DC power source. After receiving information of the first charging current, the charging and discharging apparatus charges the battery based on the first charging current through the AC power source and/or the DC power source.

Further, in a process for the charging and discharging apparatus to charge the battery based on the first charging current, the BMS can obtain a first accumulative charging amount of the battery and judge whether the first accumulative charging amount is greater than or equal to a first accumulative charging amount threshold. If a first accumulative charging amount of the battery is greater than or equal to a first accumulative charging amount threshold and a voltage of a battery cell of the battery does not exceed a full-charging voltage of the battery cell, the BMS obtains a first discharging current.

Specifically, it can be known from instructions of the battery in FIG. 1 that the battery can include one or more battery cells and the BMS can monitor whether the battery reaches a full-charging state by monitoring a voltage of one or more battery cells in the battery. Optionally, if the battery includes a plurality of battery cells, voltages of the plurality of battery cells may be different. In this case, it is judged on whether the battery reaches a full-charging state by judging whether a maximum voltage of the battery cell exceeds a full-charging voltage of the battery cell. Alternatively, in other manners, in addition to the maximum voltage of the battery cell, other voltages of the battery cells in the battery can also be used to judge whether the battery reaches a full-charging state.

When a voltage of a battery cell of the battery does not exceed a full-charging voltage of the battery cell, namely, the battery fails to reach a full-charging state, if a first accumulative charging amount of the battery is greater than or equal to a first accumulative charging amount threshold, the BMS obtains a first discharging current, that is, the battery transitions from the charging mode to a discharging mode.

Optionally, the first accumulative charging amount can be a first accumulative charging capacity or can also be a first accumulative charging battery capacity. Accordingly, if the first accumulative charging amount is the first accumulative charging capacity, the first accumulative charging amount threshold will be a first accumulative charging capacity threshold; and if the first accumulative charging amount is the first accumulative charging battery capacity, the first accumulative charging amount threshold will be a first accumulative charging battery capacity threshold.

In some implementations, the first accumulative charging amount threshold can be a preset threshold, where the preset threshold can be a fixed threshold or can also change with time according to a preset manner.

In some other implementations, the first accumulative charging amount threshold can also be determined according to the state parameter of the battery, that is, when the state parameter of the battery changes, the first accumulative charging amount threshold also changes accordingly.

Through the implementation, the first accumulative charging amount threshold can adapt to the present state parameter of the battery better so as to be capable of controlling the present charging process better and improve the charging efficiency of the battery, without causing any damage effect on the battery.

Further, in step 240 to step 260, the BMS obtains the first discharging current and transmits the first charging current to the charging and discharging apparatus, which controls discharging of the battery based on the received first discharging current.

Optionally, the BMS can obtain the first discharging current from its own functional units (for example, a storage unit or a processing unit), or the BMS can also obtain the first discharging current from other apparatus. In some implementations, the first discharging current can be a preset current, where the preset current can be of a fixed value or can also change with time according to a preset manner. Alternatively, in some other implementations, the first discharging current can also be a current determined according to the state parameter of the battery, and the first discharging current changes with a change in the state parameter of the battery. In some implementations, at the discharging mode or a discharging stage, electricity of the battery can be transmitted to an energy storage apparatus and/or a power grid, creating advantages for cyclic utilization of electrical energy. The energy storage apparatus can be disposed inside the charging and discharging apparatus and can also be disposed outside the charging and discharging apparatus, aiming to enable it to receive the discharging current of the battery. Embodiments of the present application do not make any limitation to the specific setting of the energy storage apparatus. Optionally, in the discharging mode, the battery capacity of the battery can also be consumed in other manners. Embodiments of the present application do not make any limitation to the specific manner of consuming electrical energy.

Further, in the process for the charging and discharging apparatus to control discharging of the battery, the BMS can obtain a first accumulative discharging amount in a discharging process and judges whether the first accumulative discharging amount is greater than or equal to a first accumulative discharging amount threshold.

Optionally, the first accumulative discharging amount can be a first accumulative discharging capacity or can also be a first accumulative discharging battery capacity. Accordingly, if the first accumulative discharging amount is the first accumulative discharging capacity, the first accumulative discharging amount threshold will be a first accumulative discharging capacity threshold; and if the first accumulative discharging amount is the first accumulative discharging battery capacity, the first accumulative discharging amount threshold will be a first accumulative discharging battery capacity threshold.

In some implementations, the first accumulative discharging amount threshold can be a preset threshold, where the preset threshold can be a fixed threshold or can also change with time according to a preset manner.

In some other implementations, the first accumulative discharging amount threshold can also be determined according to the state parameter of the battery, that is, when the state parameter of the battery changes, the first accumulative discharging amount threshold also changes accordingly. Through the implementation, the first accumulative discharging amount threshold can adapt to the present state parameter of the battery better so as to be capable of controlling the present discharging process better and improve the discharging efficiency of the battery, without causing any damage effect on the battery.

When the first accumulative discharging amount is greater than or equal to the first accumulative discharging amount threshold, the charging and discharging apparatus controls the battery to stop discharging.

Through the above process, the charging and discharging apparatus realizes charging and discharging of the battery based on the first charging current and the first discharging current transmitted by the BMS. Thus, heating, lithium-ion clustering and other problems caused by continuous charging of the battery can be avoided. Further, security problems of the battery caused by heating, lithium-ion clustering and other problems can be avoided, such as combustion or explosion of the battery, so as to ensure security performance of the battery. In addition, after charging the battery to the first accumulative charging amount based on the first charging current, discharging the battery capacity of the battery to the first accumulative discharging amount based on the first discharging current can discharge lithium ions clustered to cathode of the battery in the charging process, preventing lithium plating generated by continuous charging, thus improving service life and charging ability of the battery.

For battery charging, second charging can be performed on the battery continuously after one charging and one discharging, so as to continue charging of the battery.

Optionally, as shown in FIG. 2, the battery charging method 200 in embodiments of the present application can further include the following steps:

step 270: if a first accumulative discharging amount of the battery is greater than or equal to a first accumulative discharging amount threshold, obtaining a second charging current by the BMS;

step 280: transmitting the second charging current to the charging and discharging apparatus by the BMS; and step 290: receiving, by the charging and discharging apparatus, a second charging current and charging a battery based on the second charging current;

Specifically, in step 270 to step 290, the BMS judges that when a first accumulative discharging amount of the battery is greater than or equal to a first accumulative discharging amount threshold, the BMS obtains a second charging current and transmits the second charging current to the charging and discharging apparatus, which continues charging of the battery based on the received second charging current, that is, the battery re-enters the charging mode from the discharging mode. Optionally, regarding other related technical solutions in step 270 to step 290, reference can be made to related descriptions of step 210 to step 230 in the previous text. Thus, these technical solutions are not described herein any longer.

It can be understood that in embodiments of the present application, in addition to current information required for charging and discharging, voltage information required for charging and discharging is also demanded for charging and discharging the battery. For example, in step 210 to step 230, the BMS obtains a first charging current and a first charging voltage and transmits the first charging current and the first charging current to a charging and discharging apparatus, which charges the battery based on the first charging current and the first charging voltage. In step 240 to step 260, the BMS obtains a first discharging current and a first discharging voltage, and transmits the first discharging current and the first discharging voltage to a charging and discharging apparatus, which discharges the battery based on the first discharging current and the first discharging voltage. The subsequent charging and discharging process can be similar with the above charging and discharging process, such that it is not described any longer herein.

In a general case, the charging and discharging apparatus can use a power grid to charge an electric automobile. However, in a large parking lot and other special environments, an energy storage battery can be further added on the basis of FIG. 1 and the energy storage battery can be used to charge a power battery to satisfy requirements for fast charging of the electric automobile in special scenes.

Figure 3:
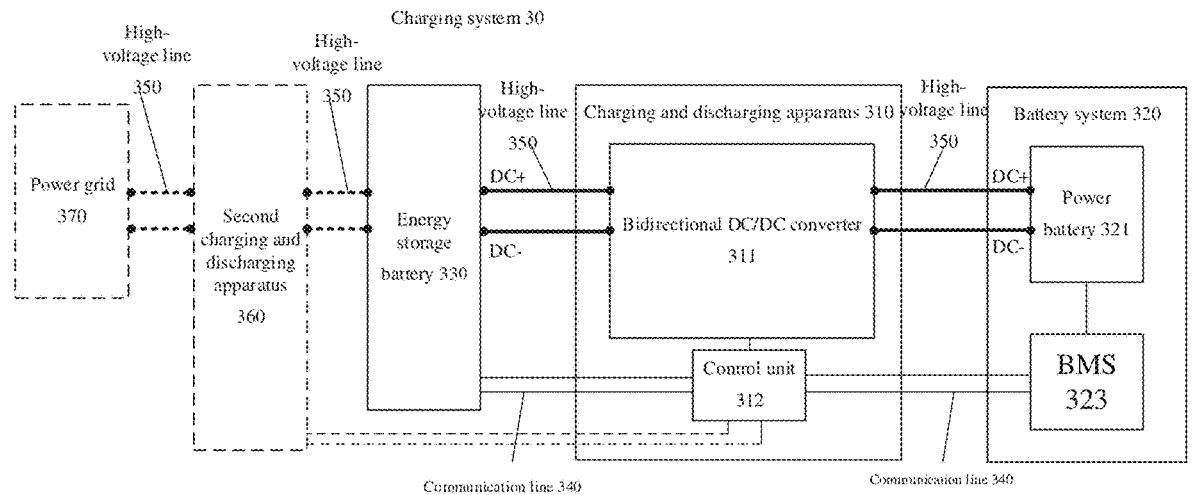
FIG. 3 is an architecture diagram of another charging system used by embodiments of the present application.

FIG. 3 shows an architecture diagram of another charging system 30 applicable in embodiments of the present application. As shown in FIG. 3, the charging system 30 can include: a charging and discharging apparatus 310, a battery system 320 and an energy storage battery 330.

Regarding descriptions of the battery system 320, reference can be made to FIG. 1 about descriptions of the battery system 120.

Optionally, the energy storage battery 330 in embodiments of the present application can be an echelon battery, or the energy storage battery 330 can exist in a form of an energy storage station, and the echelon battery or the energy storage station can charge through the power grid or can also charge through direct current, such as a photovoltaic power source, which are not limited by embodiments of the present application.

As shown in FIG. 3, the charging and discharging apparatus 310 can include a bi-directional DC/DC converter 311 and a control unit 312. At this time, the charging and discharging apparatus 310 can be a DC charging pile, which can output an adjustable DC, thus charging a power battery 321, such as a power battery of an electric automobile. Specifically, the bi-directional DC/DC converter 311 in the charging and discharging apparatus 310 can convert a power type output by the energy storage battery 330 into a power type required by the power battery 321, thus realizing charging of the power battery 321. The control unit 312 can include a controller and/or a processor for controlling the bi-directional DC/DC converter 311 to perform a charging and discharging process on the power battery 321 through the energy storage battery 330 and operation of other electrical elements in the charging and discharging battery 310.

Figure 4:
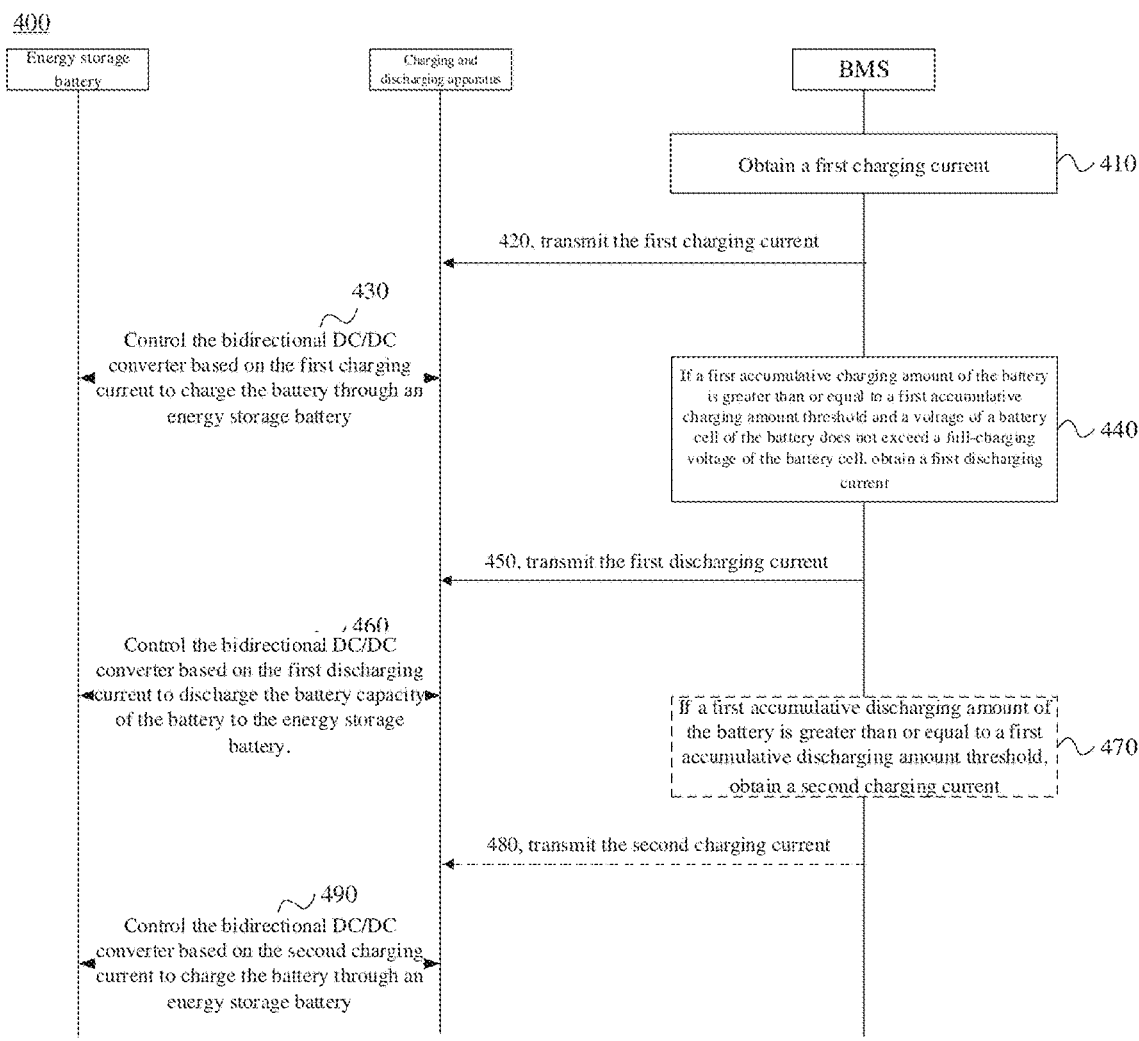
FIG. 4 is a schematic flowchart block diagram of another battery charging method provided by embodiments of the present application.

FIG. 4 shows a schematic flowchart block diagram of another battery charging method 400 in embodiments of the present application. The method 400 can be realized by the charging system 30 in FIG. 3.

As shown in FIG. 4, the battery charging method 400 can include step 410 to step 490.

Compared with the charging system 10 in FIG. 1, since the charging system 30 applicable in embodiments of the present application has an energy storage battery 330 and the charging and discharging apparatus 310 can include a bi-directional DC/DC 311 and a control unit 312, thus the methods corresponding to the two charging systems, that is, charging methods in FIG. 2 and FIG. 4 are different. The following describes different steps in the two embodiments, as the remaining steps are similar and are not repeated by embodiments of the present application.

Steps 410 to 420 are the same as steps 210 to 220 in FIG. 2.

step 430: receiving, by the charging and discharging apparatus, a first charging current, and controlling a bi-directional DC/DC converter based on the first charging current to charge a battery through an energy storage battery.

Steps 440 to 450 are the same as steps 240 to 250 in FIG. 2.

step 460: receiving, by the charging and discharging apparatus, a first discharging current, and controlling the bi-directional DC/DC converter based on the first discharging current to discharge a battery capacity of the battery to the energy storage battery.

Steps 470 to 480 are the same as steps 270 to 280 in FIG. 2.

step 490: receiving, by the charging and discharging apparatus, a second charging current, and controlling the bi-directional DC/DC converter based on the second charging current to charge the battery through the energy storage battery.

Since the current in the energy storage battery is direct current, thus the charging and discharging apparatus can charge and discharge the battery through the bi-directional DC/DC converter therein.

Through the battery charging method 400 in embodiments of the present application, in a process of charging a battery, the charging and discharging apparatus can realize charging and discharging of the battery based on a first charging current and a first discharging current transmitted by the BMS, thereby preventing continuous charging of the battery to further prevent heating, lithium ion clustering and other problems caused by continuous charging of the battery. Moreover, the battery charging method in embodiments of the present application can charge and discharge the battery with the energy storage battery through the bi-directional DC/DC converter in the charging and discharging apparatus, thus satisfying requirements for fast charging of the power battery at a large parking lot and other scenes.

Figure 5:
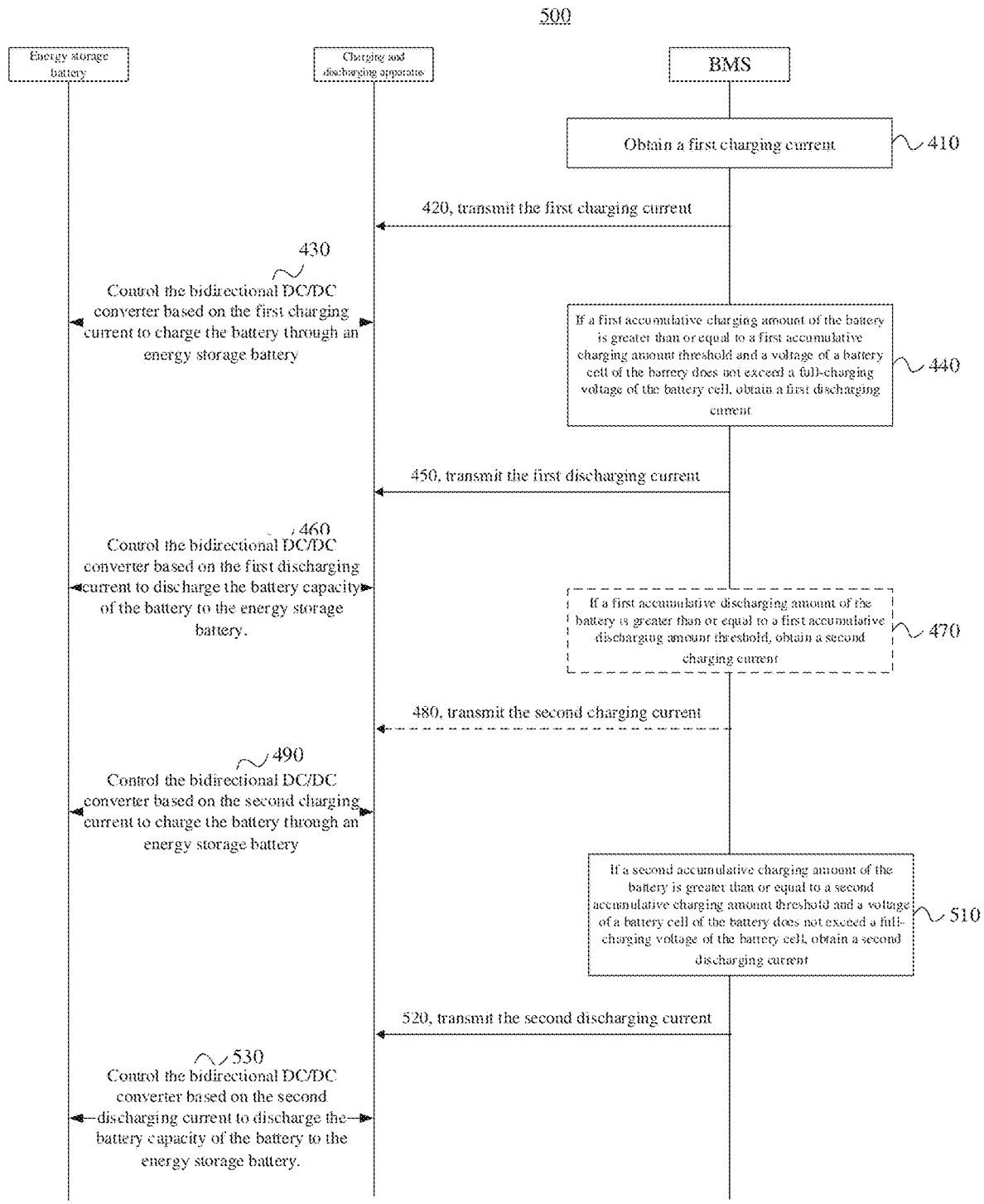
FIG. 5 is a schematic flowchart block diagram of another battery charging method provided by embodiments of the present application.

FIG. 5 shows a schematic flowchart block diagram of another battery charging method 500 provided by embodiments of the present application.

As shown in FIG. 5, the battery charging method 500 can further include the following steps in addition to step 410 to step 490.

step 510: if a second accumulative charging amount of the battery is greater than or equal to a second accumulative charging amount threshold and a voltage of a battery cell of the battery does not exceed a full-charging voltage of the battery cell, obtaining a second discharging current by the BMS;

step 520: transmitting the second discharging current to the charging and discharging apparatus by the BMS; and step 530: receiving, by the charging and discharging apparatus, a second discharging and controlling the bi-directional DC/DC converter based on the second discharging current to discharge a battery capacity of the battery to the energy storage battery.

In embodiments of the present application, charging, discharging, recharging and re-discharging of the battery are completed through information interaction between the BMS and the charging and discharging apparatus. According to the manner, embodiments of the present application can further provide a charging and discharging method circulating multiple times, which is performed in order circularly in a charging and discharging process, to realize step-by-step charging of the battery on the basis of ensuring security performance of the battery.

Specifically, in step 510, in a process for the charging and discharging apparatus to charge the battery with the energy storage battery based on the second charging current, the BMS can obtain a second accumulative charging amount of the battery and judge whether the second accumulative charging amount is greater than or equal to a second accumulative charging amount threshold.

Optionally, the second accumulative charging amount can only be a charging amount of the charging and discharging apparatus for the battery based on the second charging current, or the second accumulative charging amount can also a present total charging amount of the battery. As an example, the present total charging amount of the battery=the charging amount based on the first charging current+the charging amount based on the second charging current−the discharging amount based on the first discharging current. Accordingly, the second accumulative charging amount threshold can also be a charging amount threshold based on a single charging, or the second accumulative charging amount threshold can also be a charging amount threshold based on a total charging amount.

Similar with the first accumulative charging amount and the first accumulative charging amount threshold introduced in the previous text, in embodiments of the present application, the second accumulative charging amount can be a second accumulative charging capacity or can also be a second accumulative charging battery capacity. Accordingly, if the second accumulative charging amount is the second accumulative charging capacity, the second accumulative charging amount threshold will be a second accumulative charging capacity threshold; and if the second accumulative charging amount is the second accumulative charging battery capacity, the second accumulative charging amount threshold will be a second accumulative charging battery capacity threshold.

Optionally, in some implementations, the second accumulative charging amount threshold can be a preset threshold, where the preset threshold can be a fixed threshold or can also change with time according to a preset manner.

In some other implementations, the second accumulative charging amount threshold can also be determined according to the state parameter of the battery, that is, when the state parameter of the battery changes, the second accumulative charging amount threshold also changes accordingly.

Further, in step 510, if a second accumulative charging amount is greater than or equal to a second accumulative charging amount threshold and a voltage of a battery cell of the battery does not exceed a full-charging voltage of the battery cell, the BMS obtains a second discharging current. Further, in step 520 to step 530, the BMS transmits the second discharging current to the charging and discharging apparatus, which controls the bi-directional DC/DC converter to discharge the battery capacity to the energy storage battery based on the received second discharging current.

Specifically, regarding other related technical solutions in the above steps, reference can be made to related descriptions of step 240 to step 260 in the previous text. Thus, these technical solutions are not described herein any longer.

Figure 6:
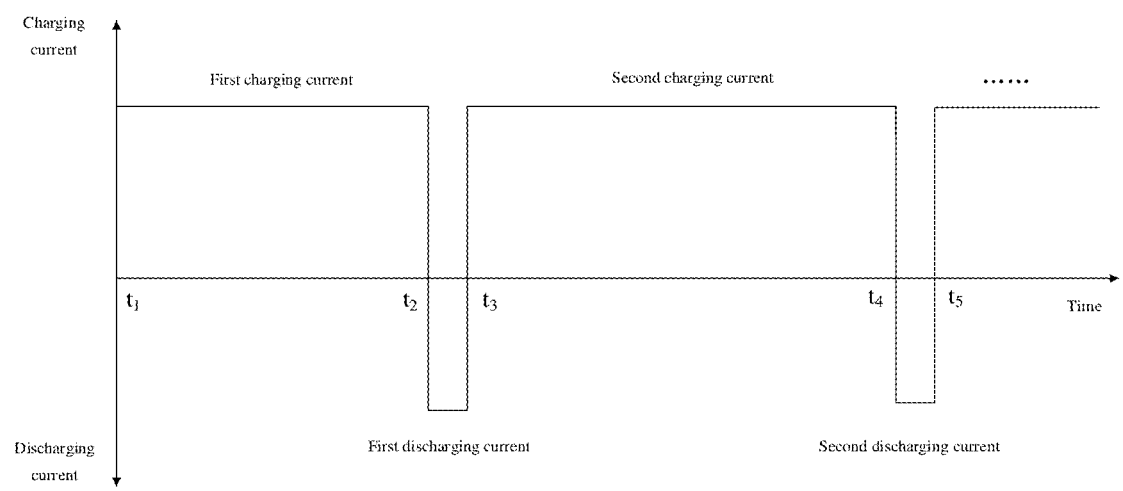
FIG. 6 is a schematic waveform diagram of a charging current and a discharging current of a battery provided by embodiments of the present application.

As an example, FIG. 6 shows a schematic waveform diagram of a charging current and a discharging current of a battery provided by embodiments of the present application.

As shown in FIG. 6, from t1 to t2 periods, the charging and discharging apparatus charges the battery based on the first charging current to that the first accumulative charging amount of the battery is greater than or equal to the first accumulative charging amount threshold and a voltage of a battery cell of the battery does not exceed a full-charging voltage of the battery cell. From t2 to t3 periods, the charging and discharging apparatus controls discharging of the battery based on the first discharging current to that the first accumulative discharging amount of the battery is greater than or equal to the first accumulative discharging amount threshold. Optionally, a duration of the first discharging current can be smaller than a duration of the first charging current. From t3 to t4 periods, the charging and discharging apparatus charges the battery continuously based on the second charging current to that the second accumulative charging amount of the battery is greater than or equal to the second accumulative charging amount threshold and a voltage of a battery cell of the battery does not exceed a full-charging voltage of the battery cell. From t4 to t5 periods, the charging and discharging apparatus controls discharging of the battery based on the second discharging current to that the second accumulative discharging amount of the battery is greater than or equal to the second accumulative discharging amount threshold. Optionally, a duration of the second charging current can be smaller than a duration of the first charging current. It can be understood that the charging process continues till full charging of the battery.

It should be noted that FIG. 6 only illustratively shows a waveform diagram of a first charging current, a second charging current, a first discharging current and a second discharging current. The first charging current from t1 to t2 can be a constant current shown in FIG. 6 or can also a changing current varying with time. Similarly, the second charging current, the first discharging current and the second discharging current can be a constant current shown in FIG. 6 or can also a changing current varying with time. In addition, FIG. 6 illustratively shows that a first charging current is the same as a second charging current in magnitude, and a first discharging current is the same as a second discharging current in magnitude. In addition, the first charging current and the second charging current can also be different in magnitude, and the first charging current and the second discharging current can also be different in magnitude. This is not limited specifically by embodiments of the present application.

In the charging methods of FIG. 4 and FIG. 5, the charging and discharging apparatus controls the bi-directional DC/DC converter based on the first discharging current to discharge the battery capacity of the battery. Optionally, the charging and discharging apparatus can discharge all of the battery capacity needing to be discharged to the energy storage battery, or can also discharge a part of the battery capacity to the energy storage battery and the other part of the battery capacity to the power grid.

Figure 7:
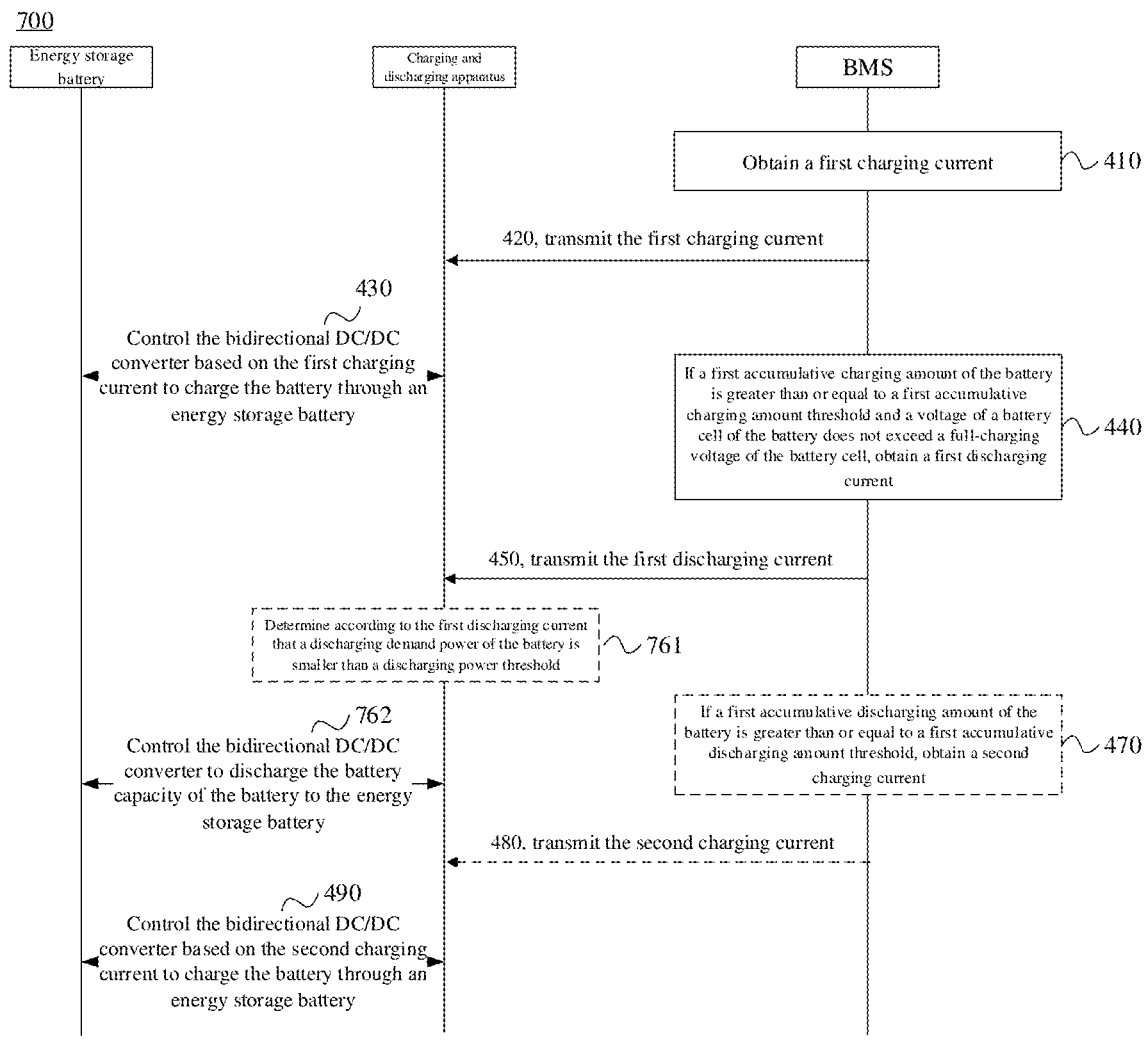
FIG. 7 is a schematic flowchart block diagram of another battery charging method provided by embodiments of the present application.

Specifically, as an implementation, FIG. 7 shows a flowchart diagram of another battery charging and discharging provided by embodiments of the present application.

As shown in FIG. 7, the charging and discharging flow 700 includes step 410 to step 490, where step 410 to step 450 and step 470 to step 490 are the same as the previous steps. Steps 461 and 462 can correspond to the previous step 460.

step 761: determining, by the charging and discharging apparatus and according to the first discharging current that a discharging demand power of the battery is smaller than a discharging power threshold; and step 762: controlling, by the charging and discharging apparatus, the bi-directional DC/DC converter to discharge the battery capacity of the battery to the energy storage battery.

It should be understood that the discharging power threshold in embodiments of the present application is a discharging power threshold of the energy storage battery. When it is determined that the discharging demand power of the power battery is smaller than the threshold of the energy storage battery, the battery capacity of the power battery can be discharged to the energy storage battery. On one hand, the power battery can be discharged in the charging process, even if lithium ion clustering phenomenon is removed. On the other hand, the battery capacity discharged by the power battery can be ensured to be within a receivable range of the energy storage battery, such that normal use of the energy storage battery can be ensured. Moreover, the battery capacity discharged by the power battery can also charge the energy storage battery, avoiding energy waste.

It should be understood that the discharging demand power threshold of the battery can be obtained according to calculation of the discharging current and the discharging voltage of the battery.

Optionally, the charging and discharging system 30 in embodiments of the present application can include a second charging and discharging apparatus 360 and a power grid 370, where the second charging and discharging apparatus 360 can include a bi-directional AC/DC converter. Optionally, the second charging and discharging apparatus 360 can be connected respectively to the energy storage battery 330 and the power grid 370 through a high-voltage line 350.

Optionally, the second charging and discharging apparatus 360 can also include a control unit, and the control unit can perform information interaction with the charging and discharging apparatus through the communication line 340.

Figure 8:
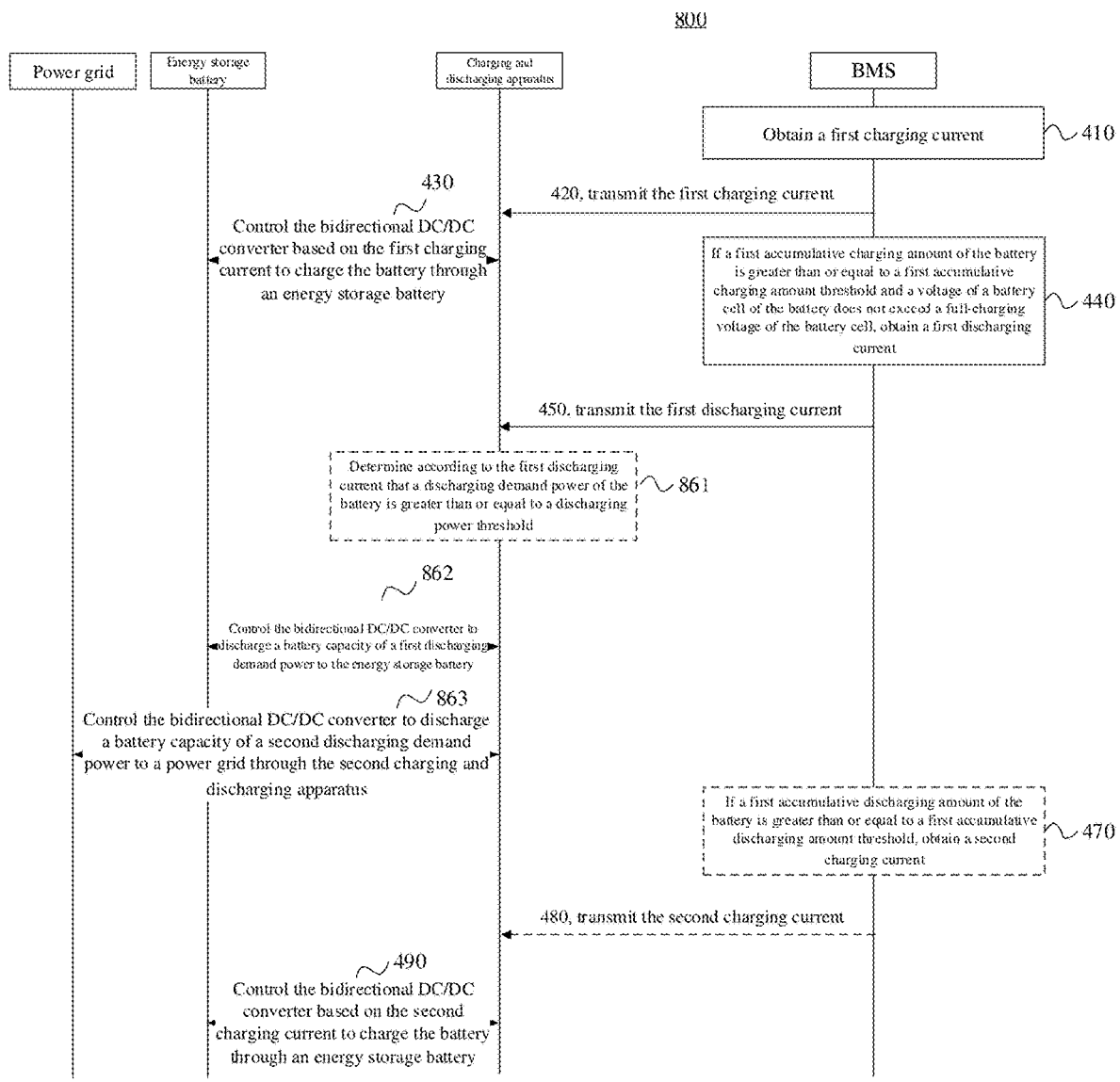
FIG. 8 is a schematic flowchart block diagram of another battery charging method provided by embodiments of the present application.

As another implementation, FIG. 8 shows a flowchart diagram of another battery charging and discharging provided by embodiments of the present application. As shown in FIG. 8, the charging and discharging flow 800 includes step 410 to step 490, where step 410 to step 450 and step 470 to step 490 are the same as the previous steps. The following only describes different steps therein:

step 861: determining, by the charging and discharging apparatus and according to the first discharging current that a discharging demand power of the battery is greater than or equal to a discharging power threshold;

step 862: controlling the bi-directional DC/DC converter to discharge a battery capacity of a first discharging demand power to the energy storage battery; and step 863: controlling the bi-directional DC/DC converter to discharge a battery capacity of a second discharging demand power to a power grid through a second charging and discharging apparatus; where the sum of the first discharging demand power and the second discharging demand power is equal to the discharging demand power.

In embodiments of the present application, when the discharging demand power of the power battery is greater than the discharging power threshold of the energy storage battery, the charging and discharging apparatus can discharge a part of the battery capacity of the power battery to the energy storage battery and discharge the remaining battery capacity of the power battery to the power grid, such as the power grid 370 shown in FIG. 3. Specifically, for example, the discharging demand power of the power battery can be Wsum, the discharging power threshold of the energy storage battery can be WDischglmt, the battery capacity of the first discharging demand power can be a battery capacity that is equal to a difference value of the discharging demand power Wsum and the discharging power threshold WDischgLmt, i.e. Wsum−WDischgLmt, and the second discharging demand power can be a battery capacity that is the same as the discharging power threshold, i.e. WDischgLmt. In this way, the discharging process can be realized in the charging process of the power battery.

It should be understood that when the charging and discharging apparatus in embodiments of the present application only includes an apparatus of a bi-directional DC/DC converter, the apparatus is a DC charging apparatus, that is, only the direct current can be converted into direct current of a different power. However, conversion of alternating current cannot be performed. Therefore, in order to realize discharge of the battery capacity of the power battery to the power grid, the charging and discharging apparatus in embodiments of the present application can also control the bi-directional DC/DC converter for discharging through the second charging and discharging apparatus. In addition, optionally, the second charging and discharging apparatus can include a bi-directional AD/DC converter. Specifically, for example, the charging and discharging apparatus can discharge the battery capacity of the power battery to the power grid through the bi-directional DC/DC converter and the bi-directional AC/DC converter in the second charging and discharging apparatus.

Since the charging system in embodiments of the present application utilizes the energy storage battery to charge and discharge the battery, the energy storage battery cannot charge the battery when the battery capacity thereof is insufficient. As an implementation, FIG. 9 provides a flowchart diagram of another battery charging method in embodiments of the present application.

Figure 9:
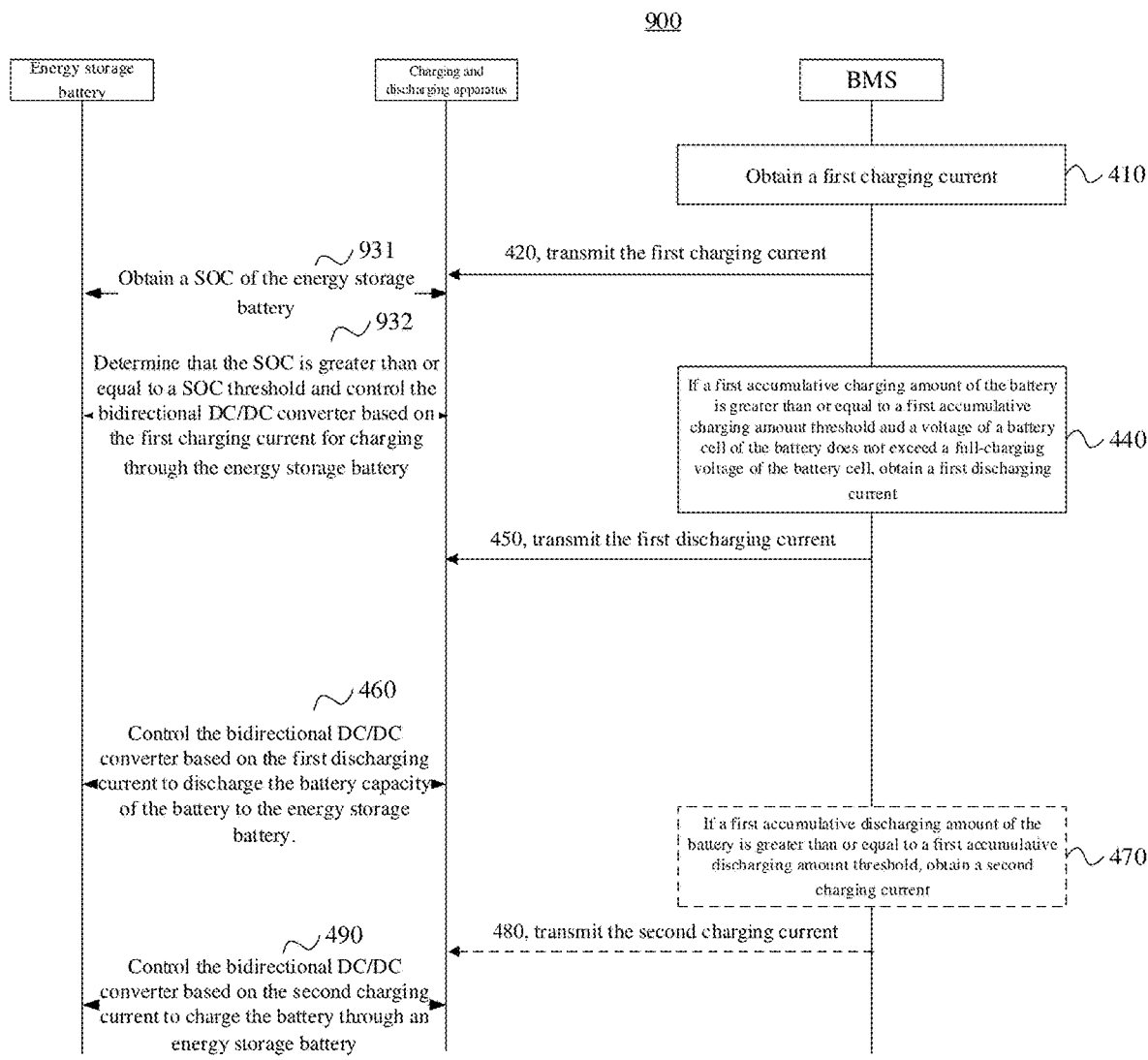
FIG. 9 is a schematic flowchart block diagram of another battery charging method provided by embodiments of the present application.

As shown in FIG. 9, the battery charging and discharging flow 900 includes step 410 to step 490, where the following only describes different steps therein.

step 931: obtaining, by the charging and discharging apparatus, a state of charge (SOC) of the energy storage battery; and step 932: determining, by the charging and discharging apparatus, that the SOC is greater than or equal to the SOC threshold and controlling the bi-directional DC/DC converter based on the first charging current to charge the battery through the energy storage battery.

It should be understood that the energy storage battery in embodiments of the present application can charge the power battery only when its own battery capacity is greater than or equal to a certain threshold, and when its own battery capacity is smaller than the threshold, its own battery capacity is firstly supplemented and then the power battery is charged.

Figure 10:
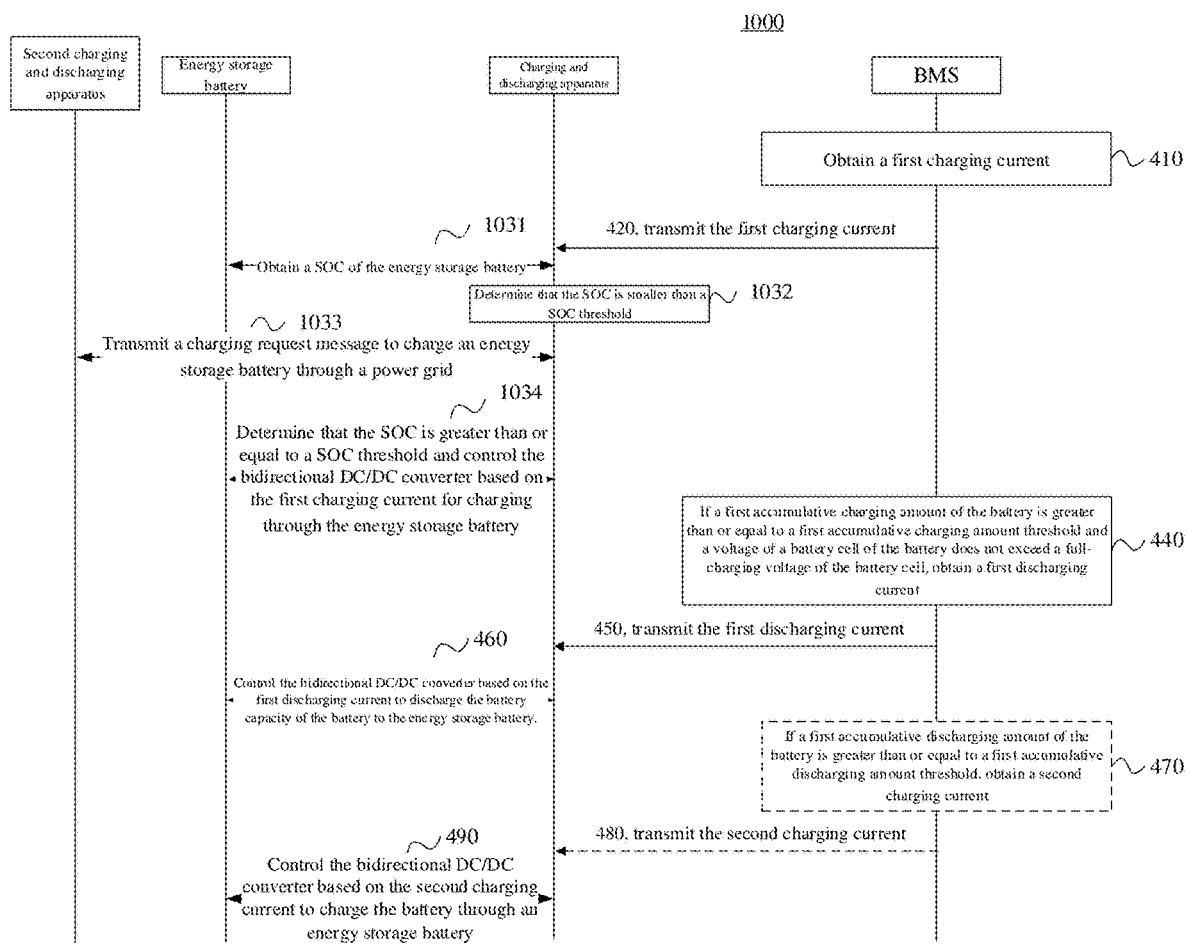
FIG. 10 is a schematic flowchart block diagram of another battery charging method provided by embodiments of the present application.

Relative to FIG. 9, as an implementation, FIG. 10 provides a flowchart diagram of another battery charging method in embodiments of the present application.

As shown in FIG. 10, the battery charging and discharging flow 1000 includes step 410 to step 490, where the following only describes different steps therein.

step 1031: obtaining a state of charge (SOC) of the energy storage battery;

step 1032: determining that the SOC is smaller than a SOC threshold;

step 1033: transmitting a charging request message to the second charging and discharging apparatus to enable the second charging and discharging apparatus to charge the energy storage battery through the power grid; and step 1034: determining that the SOC is greater than or equal to the SOC threshold and controlling the bi-directional DC/DC converter based on the first charging current to charge the battery through the energy storage battery.

It should be understood that when the energy storage battery in the present application is insufficient in the battery capacity, charging can be performed through an AC power source. Optionally, for example, the control unit can transmit a charging request message to the second charging and discharging apparatus through the communication line, requesting the second charging and discharging apparatus to charge the energy storage battery through the power grid. At this time, the second charging and discharging apparatus can include an AC/DC converter. Alternatively, optionally, the energy storage battery in embodiments of the present application can also be charged through a DC power source. At this time, the energy storage battery can utilize the DC/DC converter in the second charging and discharging apparatus for charging through the DC power source, such as a photovoltaic power source. The present application does not make any limitation to the charging manners of the energy storage battery.

Optionally, the power battery in embodiments of the present application can also be charged directly through the power grid. For example, the power grid can directly charge the power battery through the second charging and discharging apparatus (such as a bi-directional AC/DC converter therein) and the charging and discharging apparatus (such as a bi-directional DC/DC converter therein) in the present application.

Figure 11:
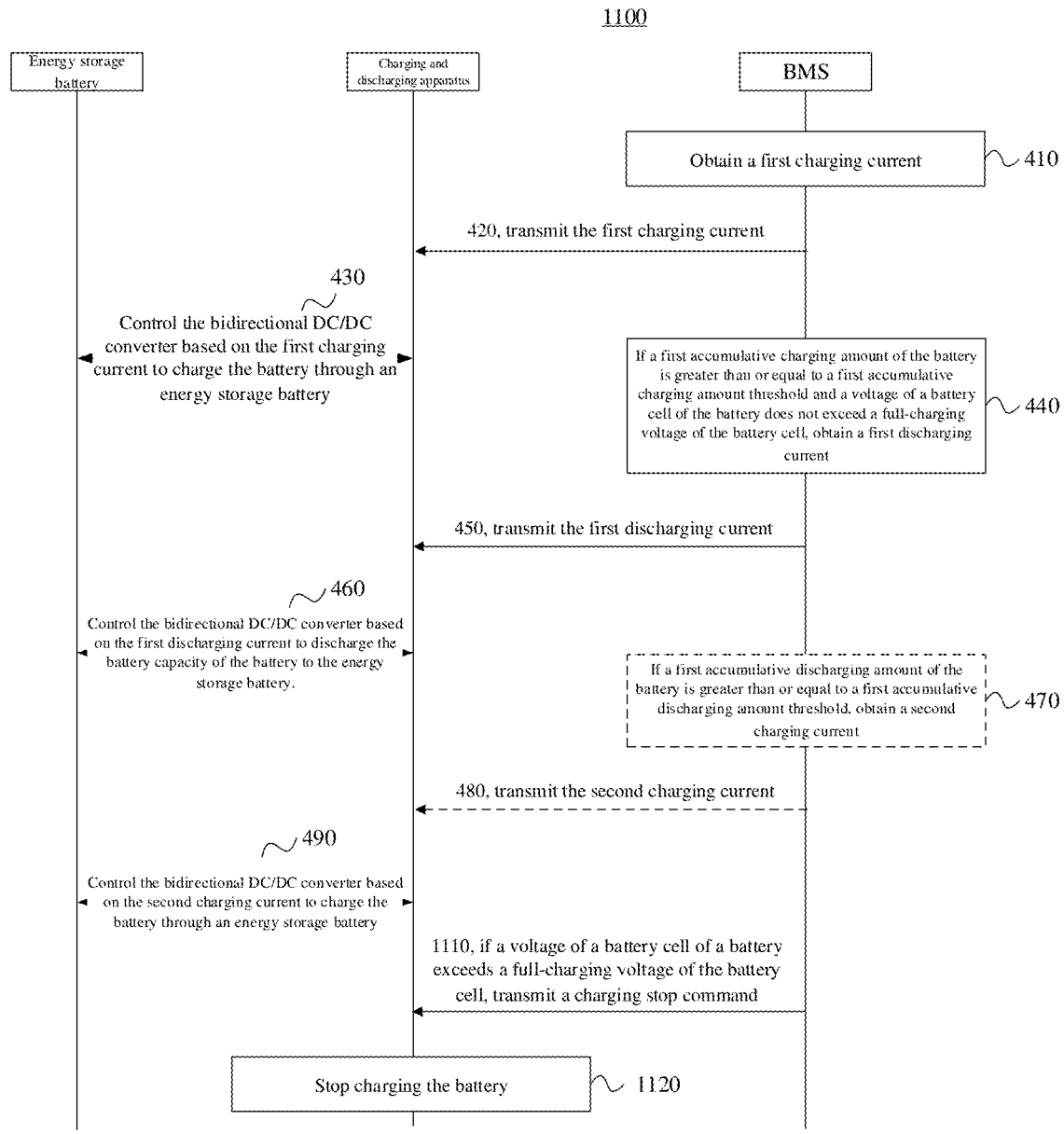
FIG. 11 is a schematic flowchart block diagram of another battery charging method provided by embodiments of the present application.

FIG. 11 shows a schematic flowchart block diagram of another battery charging method 1100 provided by embodiments of the present application.

As shown in FIG. 11, the battery charging method 1100 can further include the following steps in addition to step 410 to step 490.

step 1110: if a voltage of a battery cell of the battery exceeds a full-charging voltage of the battery cell, transmitting a charging stop command to the charging and discharging apparatus by the BMS; and step 1120: stopping charging the battery by the charging and discharging apparatus.

Specifically, as described above, the BMS can monitor whether the battery reaches a full-charging state by monitoring a voltage of one or more battery cells in the battery. Optionally, in some implementations, it is judged on whether the battery reaches a full-charging state by judging whether a maximum voltage of the battery cell exceeds a full-charging voltage of the battery cell. When the maximum voltage of the battery cell exceeds the full-charging voltage of the battery cell, it indicates that the battery reaches a full-charging state, in which case the BMS transmits a charging stop command to the charging and discharging apparatus. The charging stop command is used to indicate the charging and discharging apparatus to stop charging the battery, enabling the charging and discharging apparatus to stop charging the battery.

Optionally, step 1110 and step 1120 can be performed at a charging stage of the battery. In other words, when the BMS enters the charging mode and after the charging and discharging apparatus receives the charging current transmitted by the BMS, the BMS can obtain a voltage of a battery cell of the battery in a process of charging the battery to judge whether the battery reaches a full-charging state. Once the voltage of the battery cell of the battery exceeds the full-charging voltage of the battery cell, the BMS transmits a charging stop command to the charging and discharging apparatus, enabling the charging and discharging apparatus to stop charging the battery.

Therefore, FIG. 11 only illustratively shows performing of step 1110 and step 1120 after step 490, that is, performing in a second charging process. It can be understood that step 1110 and step 1120 can also be performed in one arbitrary charging process of charging and discharging multiple times.

Optionally, in the method embodiments, since the charging and discharging apparatus is used to charge, discharge and re-charge the battery, security problem caused to the battery due to continuous charging can be prevented. Further, the charging current in the above method can be a high current to increase a charging amount of the battery in a single charging process and achieve the purpose of fast charging.

In addition, restricted by lithium ion clustering at cathode in a continuous charging process, the charging current is also restricted. Thus, a continuous high current cannot be used to realize fast charging of the battery. However, in the technical solution of embodiments of the present application, the high current is configured to charge the battery and after a charging with the high current, the battery is discharged to release lithium ions clustered to cathode of the battery in a charging process. Further subsequently, the high current can be used again to charge the battery to realize fast charging of the battery.

Specifically, in the method, the first charging current and/or the second charging current can be a high current. In addition, after the charging and discharging apparatus charges the battery based on the second charging current, the charging current in the subsequent charging process can also be a high current.

Optionally, in order to realize fast charging with the high current, a charging rate of the first charging current and/or the second charging current ranges between 2C and 10C.

Further, the discharging current in embodiments of the present application is a low current, aiming to release lithium ions clustered to cathode of the battery through discharging of the battery with the low current, without causing excessive loss of the battery capacity that has been charged in the battery.

Specifically, in the method, the first discharging current and/or the second discharging current can be a low current. In addition, after the charging and discharging apparatus controls discharging of the battery based on the second discharging current, the discharging current in the subsequent discharging process can also be a low current.

Optionally, in order to realize discharging with the low current, a discharging rate of the first discharging current and/or the second discharging current ranges between 0.1C and 1C.

Optionally, in the method, in order to control the charging amount of the battery in the charging process and the discharging amount of the battery in the discharging process better, a ratio of an accumulative discharging amount threshold in a discharging process to an accumulative charging amount threshold in a charging process can be set to make a discharging amount smaller, without causing excessive loss of the battery capacity that has been charged in the battery.

As an example, in the method, a ratio of the first accumulative discharging amount threshold to the first accumulative charging amount threshold is smaller than or equal to 10%, and/or a ratio of the second accumulative discharging amount threshold to the second accumulative charging amount threshold is smaller than or equal to 10%.

In addition, after the charging and discharging apparatus charges the battery and controls discharging of the battery based on the second charging current and the second discharging current, a ratio of an accumulative discharging amount threshold to an accumulative charging amount threshold in a subsequent charging and discharging process can also be smaller than or equal to 10%.

It should be noted that the above ratio 10% can also be adjusted with the changes of the application scene and requirements. The present application does not make any limitation to the specific value of the ratio.

Optionally, in the method embodiment, the first charging current and the second charging current obtained by the BMS can be the same or different. The first charging current and/or the second charging current can be a preset current, or the first charging current and/or the second charging current can also be a current determined according to the state parameter of the battery. When the state parameter of the battery changes, the first charging current and/or the second charging current can be a corresponding different current under a different state parameter. Where the state parameter of the battery includes at least one of a battery temperature, a battery voltage, a battery current, a state of charge (SOC) and a battery health state (SOH) etc.

Similarly, the first discharging current and the second discharging current obtained by the BMS can be the same or different. The first discharging current and/or the second discharging current can be a preset current, or the first discharging current and/or the second discharging current can also be a current determined according to the state parameter of the battery.

If at least one of the first charging current, the second charging current, the first discharging current and the second discharging current is a current determined according to the state parameter of the battery, it can adapt to the present state parameter of the battery better, improving charging efficiency and/or discharging efficiency of the battery, without causing any damage effect on the battery.

In addition, after the charging and discharging apparatus charges the battery and controls discharging of the battery based on the second charging current and the second discharging current, the charging current and/or the discharging current in a subsequent charging and discharging process can also be a preset current or can also be a current determined according to the state parameter of the battery.

Figure 12:
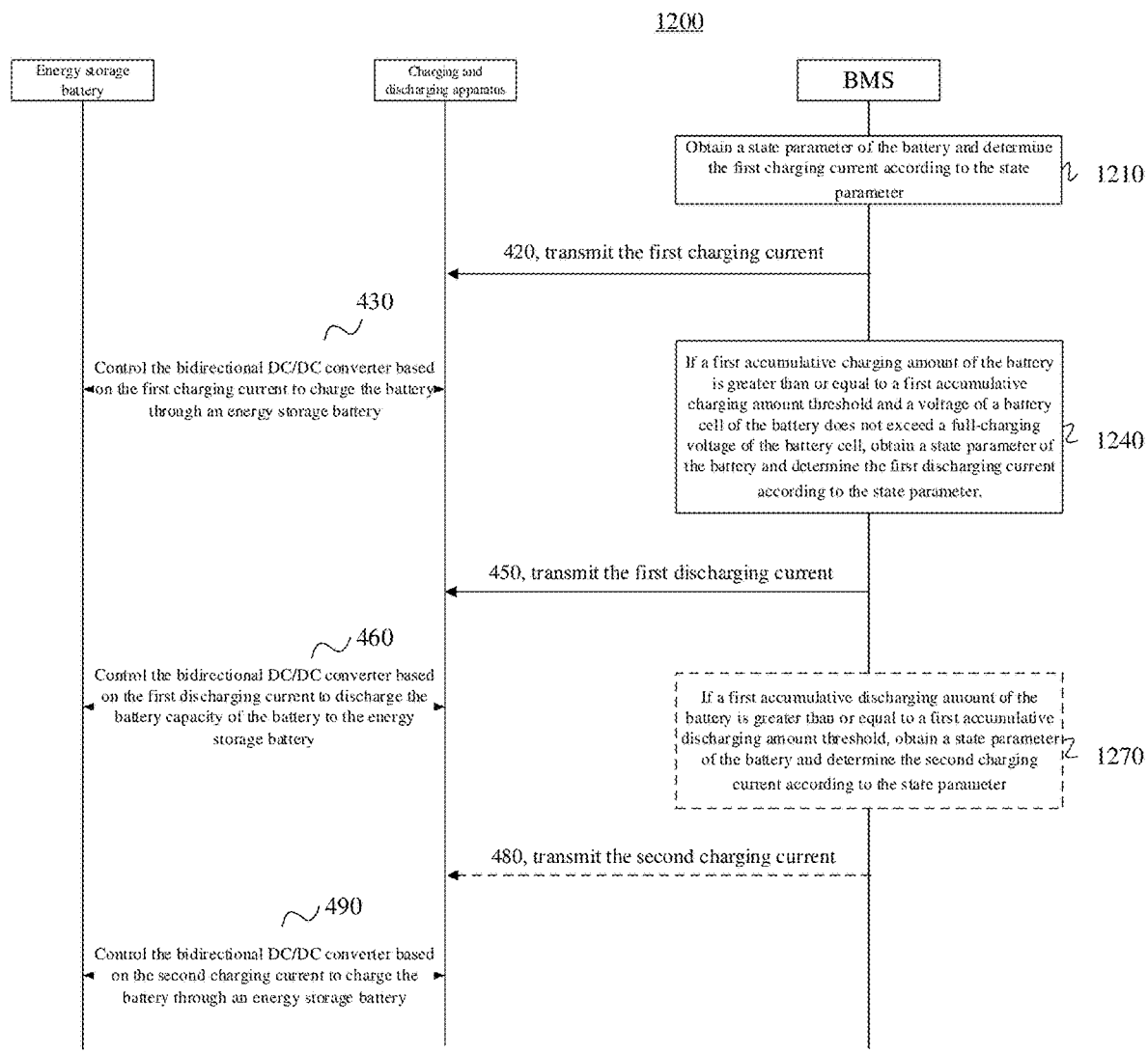
FIG. 12 is a schematic flowchart block diagram of another battery charging method provided by embodiments of the present application.

FIG. 12 shows a schematic flowchart block diagram of another battery charging method 1200 provided by embodiments of the present application.

Based on the method 400 shown in FIG. 4, as shown in FIG. 12, the step 410 can include step 1210: obtaining a state parameter of the battery by the BMS and determining the first charging current according to the state parameter.

The step 240 can include step 1240: if a first accumulative charging amount of the battery is greater than or equal to a first accumulative charging amount threshold and a voltage of a battery cell of the battery does not exceed a full-charging voltage of the battery cell, obtaining a state parameter of the battery by the BMS and determining the first discharging current according to the state parameter.

The step 470 can include step 1270: if a first accumulative discharging amount of the battery is greater than or equal to a first accumulative discharging amount threshold, obtaining a state parameter of the battery by the BMS and determining the second charging current according to the state parameter.

In addition, regarding other steps of the method 1200 in embodiments of the present application, reference can be made to related descriptions of the embodiment shown in FIG. 4. The other steps are not described any longer herein.

Specifically, in embodiments of the present application, the first charging current, the first discharging current and the second charging current are all currents determined according to the state parameter of the battery. At different periods, the BMS can obtain a different state parameter of the battery and determine the present charging current and discharging current according to the state parameter.

Optionally, there can be multiple implementations to determine the charging current and the discharging current according to the state parameter of the battery. As an example, a mapping relationship of the state parameter of the battery with the charging current and the discharging current can be obtained. According to the mapping relationship, the specific charging current and discharging current are determined through the state parameter of the battery, where the mapping relationship can be a mapping relationship obtained by fitting a large number of experimental data, such that the mapping relationship is highly reliable and accurate; and the mapping relationship can specifically be a mapping table, a mapping diagram or a mapping formula etc. In addition, in other examples, a dedicated neural network model can also be trained according to a large number of experimental data, and the neural network model can output the charging current and the discharging current according to the input state parameter of the battery.

Optionally, in addition to the charging current and the discharging current, in the method embodiment, the first accumulative charging amount threshold and the second accumulative charging amount threshold can be the same or different. The first accumulative discharging amount threshold and the second accumulative discharging amount threshold can be the same or different. At least one of the first accumulative charging amount threshold, the second accumulative charging amount threshold, the first accumulative discharging amount threshold and the second accumulative discharging amount threshold can be a preset threshold. Alternatively, at least one of the first accumulative charging amount threshold, the second accumulative charging amount threshold, the first accumulative discharging amount threshold and the second accumulative discharging amount threshold can also be a threshold determined according to the state parameter of the battery.

In addition, after the charging and discharging apparatus charges the battery and controls discharging of the battery based on the second charging current and the second discharging current, the accumulative discharging amount threshold and the accumulative charging amount threshold in a subsequent charging and discharging process can be a preset threshold or can also be a threshold determined according to the state parameter of the battery.

Through the application embodiment, if at least one of the first accumulative charging amount threshold, the second accumulative charging amount threshold, the first accumulative discharging amount threshold and the second accumulative discharging amount threshold is a threshold determined according to the state parameter of the battery, it can adapt to the present state parameter of the battery better so as to be capable of controlling the present charging process and/or the discharging process better to ensure the charging amount and the discharging amount and realize efficient charging of the battery.

Optionally, in the method embodiment, at least one of the first charging current, the second charging current, the first discharging current and the second discharging current can be a current obtained by the BMS regularly or irregularly. As an example, at least one of the first charging current, the second charging current, the first discharging current and the second discharging current can be a current determined by the BMS regularly or irregularly according to the state parameter of the battery, and the current changes with a change in the state parameter of the battery. Specifically, the BMS can regularly obtain the state parameter of the battery, thus determining at least one of the first charging current, the second charging current, the first discharging current and the second discharging current. Alternatively, the BMS obtains the state parameter of the battery on a real time basis and when the state parameter changes irregularly, the BMS determines at least one of the first charging current, the second charging current, the first discharging current and the second discharging current according to the state parameter that changes irregularly.

Further, on such a basis, the BMS regularly or irregularly transmits at least one of the first charging current, the second charging current, the first discharging current and the second discharging current to the charging and discharging apparatus, enabling the charging and discharging apparatus to charge the battery or control discharging of the battery based on the regularly transmitted current.

In the implementation, in the process for the charging and discharging apparatus to charge once and/or discharge once the battery, the charging current and/or the discharging current is regularly or irregularly transmitted by the BMS. On one hand, through the implementation, the charging current and/or the discharging current can be adjusted regularly or irregularly to improve charging and discharging efficiencies. On the other hand, normal state of the BMS and the battery can be represented through the charging current and/or the discharging current transmitted regularly or irregularly, and the charging and discharging apparatus can continue to charge the battery or control discharging of the battery. Therefore, in the implementation, if the charging and discharging apparatus does not receive the charging current and/or the discharging current regularly or irregularly transmitted by the BMS, the charging and discharging apparatus can stop charging the battery and/or stop controlling discharging of the battery to ensure security performance of the battery.

Figure 13:
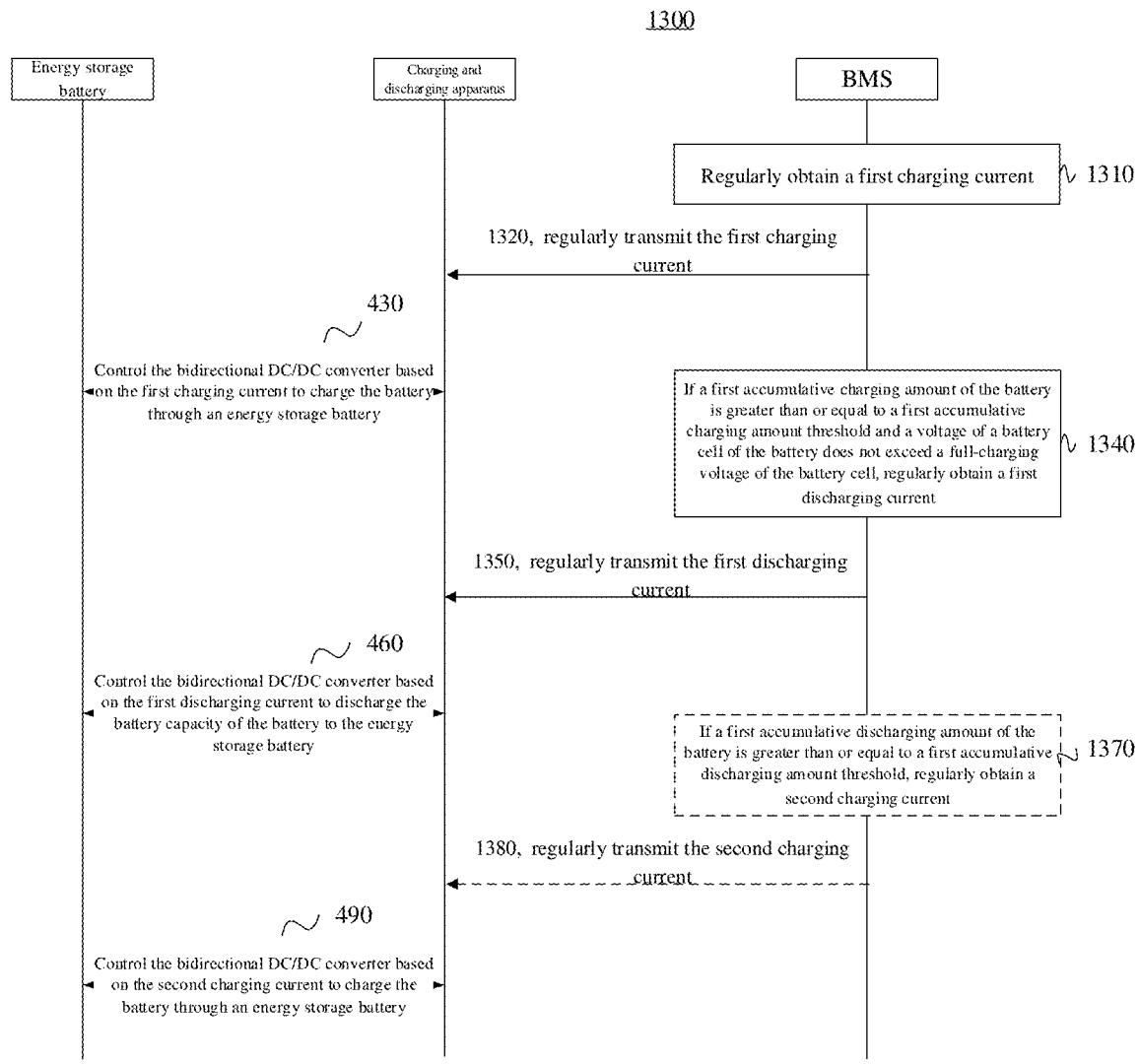
FIG. 13 is a schematic flowchart block diagram of another battery charging method provided by embodiments of the present application.

FIG. 13 shows a schematic flowchart block diagram of another battery charging method 1300 provided by embodiments of the present application.

Based on the method 400 shown in FIG. 4, as shown in FIG. 13, the step 410 can include step 1310: regularly obtaining a first charging current by the BMS.

The step 220 can include step 1320: regularly transmitting the first charging current to the charging and discharging apparatus by the BMS;

The step 240 can include step 1340: if a first accumulative charging amount of the battery is greater than or equal to a first accumulative charging amount threshold and a voltage of a battery cell of the battery does not exceed a full-charging voltage of the battery cell, regularly obtaining the first discharging current;

The step 250 can include step 1350: regularly transmitting the first charging current to the charging and discharging apparatus by the BMS;

The step 270 can include step 1370: if a first accumulative discharging amount of the battery is greater than or equal to a first accumulative discharging amount threshold, regularly obtaining the second charging current;

The step 280 can include step 1380: regularly transmitting the second charging current to the charging and discharging apparatus by the BMS;

In addition, regarding other steps of the method 1300 in embodiments of the present application, reference can be made to related descriptions of the embodiment shown in FIG. 4. The other steps are not described any longer herein.

In embodiments of the present application, the BMS can regularly obtain the first charging current, the first discharging current and the second charging current. Accordingly, the BMS can regularly transmit the first charging current, the first discharging current and the second charging current to the charging and discharging apparatus.

It can be understood that in the embodiment, in addition to current information required for charging and discharging, voltage information required for charging and discharging is also demanded for charging and discharging the battery. The manner of obtaining the voltage required for charging and discharging does not cause any limitation to embodiments of the present application.

Optionally, in the method embodiment, the communication between the BMS and the charging and discharging apparatus is compatible with the communication protocol between the existing charger and the BMS. Thus, the communication between the BMS and charging and discharging apparatus is convenient to be implemented, thereby possessing a favorable application prospect.

Specifically, based on the method embodiment, the BMS can also obtain at least one of the first charging voltage, the second charging voltage, the first discharging voltage and the second discharging voltage, and transmit at least one of the first charging voltage, the second charging voltage, the first discharging voltage and the second discharging voltage to the charging and discharging apparatus, where the first charging current and the first charging voltage are carried in a first battery charging demand (BLC) message, and/or the first discharging current and the first discharging voltage are carried in a second BLC message, and/or the second charging current and the second charging voltage are carried in a third BLC message, and/or the second discharging current and the second discharging voltage are carried in a fourth BLC message.

In addition, after the charging and discharging apparatus charges the battery and controls discharging of the battery based on the second charging current and the second discharging current, the charging current, the charging voltage, the discharging current and the discharging voltage in a subsequent charging and discharging process can also be carried in BLC messages and transmitted to the charging and discharging apparatus through the BMS.

Figure 14:
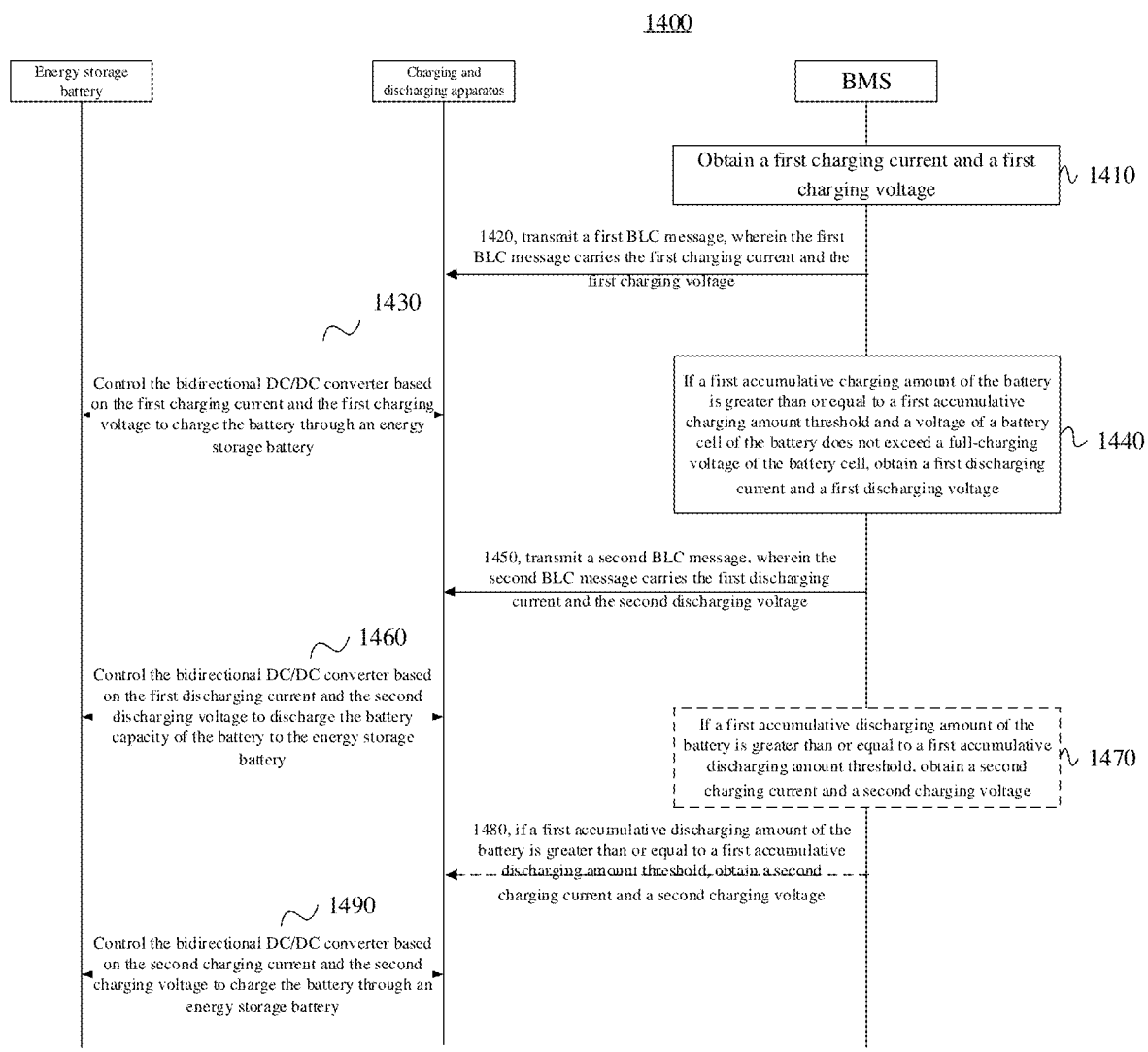
FIG. 14 is a schematic flowchart block diagram of another battery charging method provided by embodiments of the present application.

FIG. 14 shows a schematic flowchart block diagram of another battery charging method 1400 provided by embodiments of the present application.

As shown in FIG. 14, the battery charging method 1400 can include the following steps:
step 1410: obtaining a first charging current and a first charging voltage by a BMS;
step 1420: transmitting a first BLC message to a charging and discharging apparatus by the BMS, where the first BLC message carries the first charging current and the first charging voltage;
step 1430: charging a battery by the charging and discharging apparatus based on the first charging current and the first charging voltage;
step 1440: if a first accumulative charging amount of the battery is greater than or equal to a first accumulative charging amount threshold and a voltage of a battery cell of the battery does not exceed a full-charging voltage of the battery cell, obtaining a first discharging current and a first discharging voltage by the BMS;
step 1450: transmitting a second BLC message to the charging and discharging apparatus by the BMS, where the second BLC message carries the first discharging current and the second discharging voltage;
step 1460: controlling discharging of the battery by the charging and discharging apparatus based on the first discharging current and the second discharging voltage;

step 1470: if a first accumulative discharging amount of the battery is greater than or equal to a first accumulative discharging amount threshold, obtaining a second charging current and a second charging voltage by the BMS;

step 1480: transmitting a third BLC message to the charging and discharging apparatus by the BMS, where the third BLC message carries the second charging current and the second charging voltage; and step 1490: charging the battery by the charging and discharging apparatus based on the second charging current and the second charging voltage.

In embodiments of the present application, using a battery charging demand (BLC) message in a communication protocol between the existing charger and the BMS, the BMS transmits the charging current and the discharging current to the charging and discharging apparatus, which charges the battery or controls discharging of the battery based on the received charging current and discharging current.

Optionally, in the BLC message, the charging voltage (comprising the first charging voltage and the second charging voltage) and the discharging voltage (comprising the first discharging voltage and the second discharging voltage) are of different scopes, and the charging current (comprising the first charging current and the second charging current) and the discharging current (comprising the first discharging current and the second discharging current) are of different scopes. In the BLC message received by the charging and discharging apparatus, it can be judged through the magnitude of the voltage and current carried therein on whether it belongs to the charging voltage and the charging current or belongs to the discharging voltage and the discharging current.

Optionally, the BMS determines the charging voltage and the discharging voltage according to the state parameter of the battery, or the charging voltage and the discharging voltage can also be a preset value.

Optionally, in some implementations, the BMS can regularly obtain the charging current and the charging voltage and regularly transmits a BLC message carrying the charging current and the charging voltage to the charging and discharging apparatus. Similarly, the BMS can also regularly obtain the discharging current and the discharging voltage and regularly transmits a BLC message carrying the discharging current and the discharging voltage to the charging and discharging apparatus. In the implementation, the manner for regularly transmitting the BLC message is the same as the manner for regularly transmitting the BLC message in the prior standard.

The embodiment makes descriptions with an example of an information interaction message of the charging and discharging current and/or voltage. It can be understood that in order to realize charging and discharging of the battery, in addition to processing at the charging and discharging stage, a handshake interaction of a vehicle and a charger before charging and discharging, parameter configuration interaction of charging and discharging and the like can also be included, and are not specifically limited by embodiments of the present application herein.

Optionally, the communication protocol between the charger and the BMS includes a communication protocol under a vehicle to grid (V2G) mode and a grid to vehicle (G2V) mode.

Figure 15:
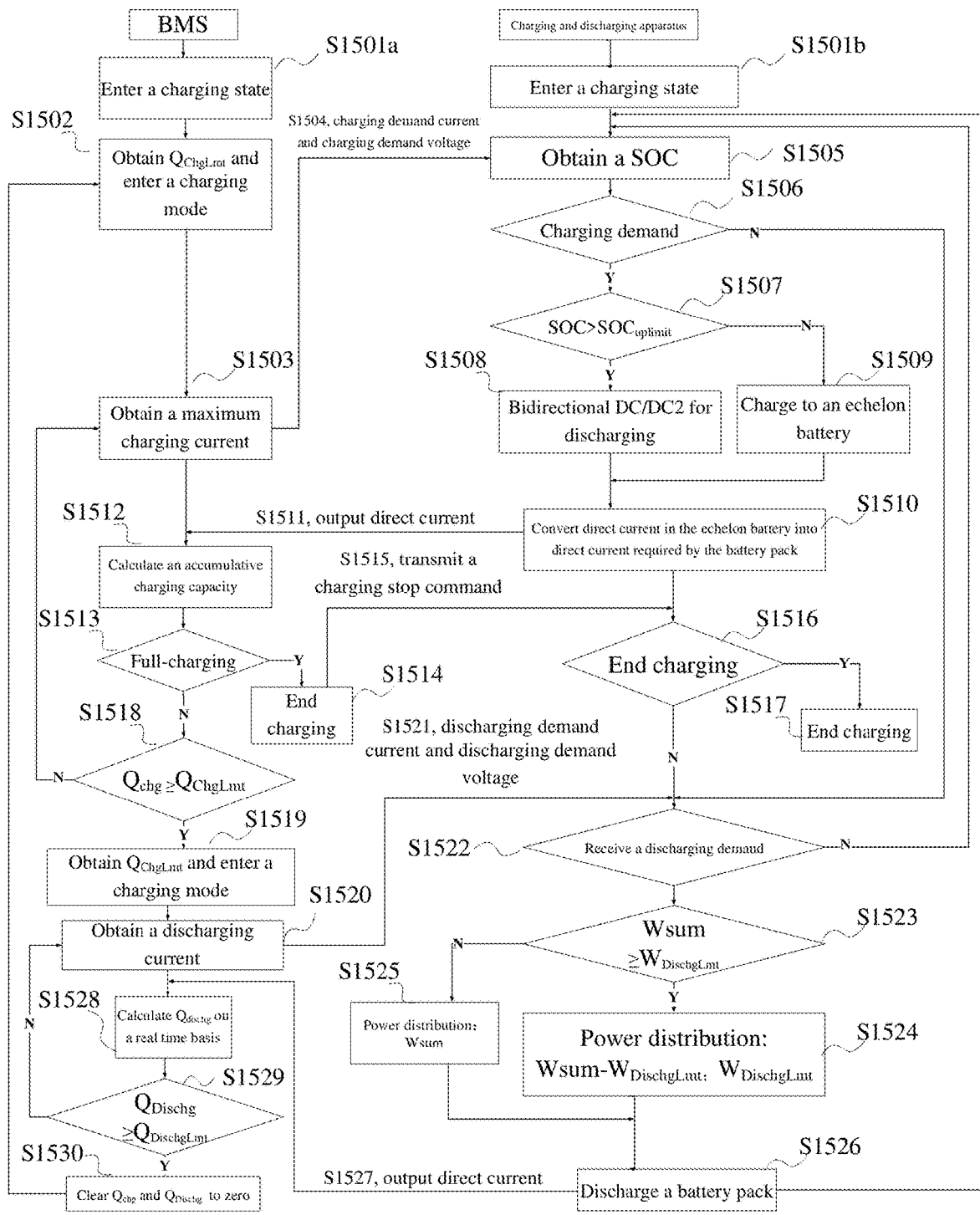
FIG. 15 is a flowchart diagram of a battery charging provided by embodiments of the present application.

In order to further describe the charging and discharging process in embodiments of the present application, the following makes descriptions with an example of a charging and discharging flowchart diagram in embodiments of the present application shown in FIG. 15, where regarding the charging and discharging apparatus and the BMS, reference can be made to related descriptions of the charging and discharging system 30 in FIG. 4. As shown in FIG. 15, the charging and discharging flow includes:

S1501a, after a user inserts a shot, a BMS enters a charging state according to a control process of a DC charging.

Meanwhile, the charging and discharging apparatus can also sense a shot state and perform step S1501b. After the user inserts the shot, the charging and discharging apparatus enter the charging flow state according to the control process of the DC charging. More specifically, the control unit in the charging and discharging apparatus, such as the control unit in FIG. 2, controls the charging and discharging apparatus to enter the charging flow state.

To facilitate understandings, the battery in the present application is described with the power battery on the electric automobile as the example. However, embodiments of the present application do not limit this.

As an optional manner for an electrical connection, a first charging shot is disposed on the energy storage battery, and the charging and discharging apparatus can be provided with a first charging socket corresponding to the first charging shot to receive electrical energy transmitted from the energy storage battery. In addition, the charging and discharging apparatus is also provided with a second charging shot simultaneously, and the second charging shot is configured to an electrical connection to a second charging socket on the electric automobile to realize transmission of electrical energy to the battery of the electric automobile by the charging and discharging apparatus.

In order to adapt to an electrical connection between the existing charging and discharging apparatus and the battery system of the electric automobile, optionally, the specific type and structure of the second charging shot on the charging and discharging apparatus can be the same as the specific type and structure of the first charging shot on the energy storage battery. Accordingly, the specific type and structure of the first charging socket on the charging and discharging apparatus can be the same as the specific type and structure of the second charging socket on the electric automobile. Certainly, the second charging shot and the first charging shot, and the first charging socket and the second charging socket may not be the same, and embodiments of the present application do not make specific limitation to this, aiming to realize an electrical connection of the charging shot to the corresponding charging socket thereof.

S1502, the BMS can obtain a battery accumulative charging capacity threshold QChgLmt according to a state parameter of a battery pack and enter a charging mode.

Optionally, the state parameter in embodiments of the present application can include a voltage of a core cell, a core temperature and SOH etc. and the BMS can obtain the accumulative charging capacity threshold for switching from charging to discharging through a manner of looking up a table according to the state parameter of the battery.

S1503, the BMS obtains a charging demand current ReqChg_I and a charging demand voltage of a battery according to the state parameter of the battery pack.

It should be understood that the charging demand current obtained by the BMS can be a maximum charging current that the battery can permit under the present state of the battery. The charging demand current and the charging demand voltage can also be obtained by the BMS through a manner of looking up a table, and specifically be obtained by the BMS by looking up a table according to the state parameter of the monitored battery.

It should be understood that the BMS can perform real-time monitoring on the state parameter of the battery and obtain a real-time charging demand current and voltage according to a data look-up take obtained by monitoring. For example, the BMS can obtain a real-time charging demand current and voltage according to a certain time period.

S1504, the BMS transmit the obtained charging demand current and charging demand voltage to a charging and discharging apparatus.

It should be understood that the BMS can also carry other related information in a message carrying the charging demand current and charging demand voltage, such as a charging demand power etc. Embodiments of the present application do not make any limitation to this.

Optionally, the BMS can transmit information of the charging demand current and the charging demand voltage to the charging and discharging apparatus through the CAN communication manner via the national-standard charging criteria.

After performing step S1501b and entering the charging stage, the charging and discharging apparatus can obtain the present battery capacity of the energy storage battery, such as the echelon battery, i.e. S1505, obtaining the SOC of the echelon battery.

It should be understood that the SOC here refers to a state of charge (SOC) and the SOC can reflect the available state of the residual charge in the battery.

S1506, the charging and discharging apparatus confirms whether the charging demand information transmitted by the BMS is received, that is, what is transmitted by the BMS includes information of the charging demand voltage and the charging demand current.

Optionally, the step for the charging and discharging apparatus to obtain the SOC of the echelon battery and the step for determining whether to receive the charging demand of the BMS can be performed simultaneously, or the charging and discharging apparatus can also firstly determine receiving of the charging demand and then obtains the SOC of the echelon battery. Embodiments of the present application do not make any limitation to this.

S1507, after obtaining the SOC of the echelon battery, the charging and discharging apparatus can firstly judge whether the SOC of the echelon battery is greater than the SOC threshold ($SOC_{uplimit}$) of the echelon battery.

By judging the relationship of the SOC and the threshold of the echelon battery, it can be ensured that the battery is charged when the echelon battery is sufficient in the battery capacity.

S1508, when the SOC is greater than $SOC_{uplimit}$, the charging and discharging apparatus can control the bi-directional DC/DC converter to start discharging with the output power being $W_{SUM}$. Specifically, the voltage output by the echelon battery can be converted through the bi-directional DC/DC converter for charging the battery.

S1509, alternatively, when the charging and discharging apparatus determines that when the SOC is smaller than or equal to $SOC_{uplimit}$, the charging and discharging apparatus can take electricity from the power grid through the AC/DC converter to charge the echelon battery till the SOC of the echelon battery is greater than $SOC_{uplimit}$.

Optionally, according to the above descriptions, when the charging and discharging apparatus in embodiments of the present application only includes a bi-directional DC/DC converter, in order to realize the purpose of taking electricity from the power grid to charge the echelon battery, the charging and discharging apparatus can transmit a charging request message to other charging and discharging apparatus comprising an AC/DC converter, requesting the other charging and discharging apparatus to charge the echelon battery through the power grid. Alternatively, optionally, when the charging and discharging apparatus not only includes a bi-directional DC/DC converter, but also includes an AC/DC converter, the charging and discharging apparatus can directly control the AC/DC converter to take electricity from the power grid and charge the echelon battery.

S1510, the charging and discharging apparatus converts direct current in the echelon battery into direct current required by the battery.

S1511, the charging and discharging apparatus outputs direct current to the battery according to requirements of the BMS to charge the battery.

S1512, the BMS calculates the accumulative charging capacity Qchg in the charging process on a real time basis by employing a current on a battery bus, where $Qchg=I*t$, and I here means the charging current in the charging process.

Optionally, the bus can be the high-voltage line 250 in FIG. 2.

S1513, the BMS determines whether the battery reaches a full-charging state presently according to the maximum charging voltage of the battery, i.e. Ucell_max>Ucell_FullChg, where Ucell_max is the maximum charging voltage that the battery can permit and Ucell_FullChg is the voltage value when the battery reaches full-charging.

S1514, the BMS determines to end the charging when it is determined that the battery reaches a full-charging state.

S1515, after determining to end the charging, the BMS transmits a charging stop demand command to the charging and discharging apparatus.

S1516, the charging and discharging apparatus determines whether the charging stop demand command is received.

S1517, the normal off-electricity process is performed to end the charging when the charging and discharging apparatus confirms receiving of the charging stop demand command.

S1518, if the BMS determines that the maximum charging voltage that the battery permits is smaller than the full-charging voltage value of the battery, it is further determined whether the accumulative charging capacity Qchg is greater than or equal to the charging capacity threshold Qchglmt.

If the BMS determines that the accumulative charging capacity Qchg is smaller than the charging capacity threshold Qchglmt, the BMS re-enters step 1503 and according to the recently obtained charging current, enables the charging and discharging apparatus to continue charging of the battery.

Alternatively, S1519, the BMS determines that the accumulative charging capacity is greater than or equal to the charging capacity threshold, the accumulative discharging capacity threshold can be obtained by looking up a table according to the state parameter of the battery and the battery is controlled to enter the discharging mode.

S1520, the BMS further obtains the discharging demand current ReqDischg_I by looking up a table according to the state parameter of the battery.

Optionally, the discharging demand current can be a permitted maximum discharging current, where the current can be obtained by looking up a table by obtaining the state parameter of the battery under a different temperature.

S1521, the BMS transmits a message comprising the discharging demand current and the discharging demand voltage to the charging and discharging apparatus, where the discharging demand power is Wsum_dischg.

S1522, when the charging and discharging apparatus determines no receiving of the charging stop demand command in step S1516 or after the charging and discharging apparatus receives the discharging demand current and the discharging demand power transmitted by the BMS, the charging and discharging apparatus can determine whether the discharging demand message is received, i.e. a message comprising the discharging demand current and the discharging demand voltage.

If the charging and discharging apparatus does not receive the discharging demand message, it returns to step S1505.

S1523, if the charging and discharging apparatus receives the discharging demand message, it is judged whether the discharging demand power Wsum_dischg is greater than or equal to the discharging power threshold WDischgLmt, where the discharging power threshold is a threshold of the echelon battery.

S1524, if Wsum_dischg is greater than or equal to WDischgLm, the charging and discharging apparatus discharges the battery capacity of the first discharging demand power to the echelon battery and discharges the battery capacity of the second discharging demand power to the power grid, where the first discharging demand power is Wsum_dischg−WDischgLmt and the second discharging demand power is WDischgLmt.

It should be understood that according to the previous description, if the direct current in the battery is discharged to the power grid, it is necessary to convert direct current into alternating current. The charging and discharging apparatus in embodiments of the present application can discharge the battery capacity of the battery to the power grid through the bi-directional DC/DC converter included in the charging and discharging apparatus and the bi-directional AC/DC converter included in other charging and discharging apparatus, or when the charging and discharging apparatus includes a bi-directional AC/DC converter, the charging and discharging apparatus can directly control the bi-directional DC/DC converter and the bi-directional AC/DC converter to discharge the battery capacity of the battery to the power grid.

S1525, alternatively, when Wsum_dischg is smaller than WDischgLm, the charging and discharging apparatus can discharge all of the battery capacity of the battery to the echelon battery through the bi-directional DC/DC converter with the discharging power being Wsum_dischg.

S1526, the charging and discharging apparatus discharges the battery according to requirements of the BMS.

S1527, the charging and discharging apparatus outputs direct current according to requirements of the BMS.

S1528, the BMS calculates the accumulative discharging capacity QDischg on a real time basis by employing current on the battery bus, where QDischg=I*t and I here refers to the discharging demand current.

S1529, the BMS determines whether QDischg is greater than or equal to the accumulative discharging capacity threshold QDischgLmt.

If QDischg is smaller than QDischgLmt, the BMS returns to step S1520, enabling the charging and discharging apparatus to continue discharging of the battery.

S1529, if QDischg is greater than or equal to QDischgLmt, the BMS clears the accumulative charging capacity Qchg and QDischg to zero, re-calculates Qchg and QDischg, and returns to step S1502 to continue switch of the charging and discharging process.

Through the charging and discharging process in embodiments of the present application, on one hand, the step of discharging with a small-rate current shortly can be added in a process of continuous fast charging of the battery with a big-rate current and lithium ion clustering to cathode of the battery can be timely removed. Meanwhile, the risks of core lithium plating are removed so as to continuously ensure the charging security of the battery, thereby effectively suspending attenuation of the battery's service life. Meanwhile, the charging rate can be greatly improved, thereby shortening the charging time in general. Moreover, even at a low temperature, the battery can prevent the problem of gradually increasing the charging current only in a conventional unidirectional charging that heating etc. must be performed firstly till the temperature of the battery pack reaches a certain extent through the mode for mutual alternation of charging and discharging.

On the other hand, the charging and discharging apparatus can charge and discharge the battery only through the echelon battery, or perform charging and discharging through the power grid by further combination with the unidirectional or bi-directional AC/DC converter, resulting in flexible configuration and strong mobility of the system.

The previous text describes the specific embodiments of the battery charging methods provided by the present application in FIG. 2 to FIG. 15. The following describes the specific embodiments of related apparatuses provided by the present application by combining FIG. 16 to FIG. 17. It can be understood that regarding related descriptions in each apparatus embodiment, reference can be made to each method embodiment above. For conciseness, they are not repeated herein.

Figure 16:
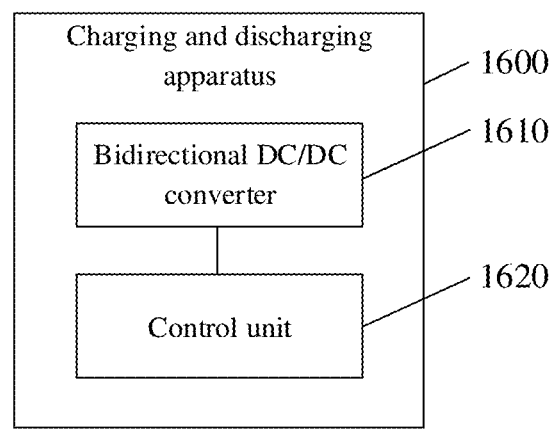
FIG. 16 is a schematic structural block diagram of a charging and discharging apparatus provided by embodiments of the present application.

FIG. 16 shows a schematic structural block diagram of a charging and discharging apparatus provided by embodiments of the present application.

As shown in FIG. 16, the charging and discharging apparatus 1600 can include a bi-directional DC/DC converter 1610 and a control unit 1620.

Optionally, the control unit is configured to: receive a first charging current transmitted by a battery management system (BMS) of a battery and control the bi-directional DC/DC converter based on the first charging current to charge the battery through an energy storage battery; receive a first discharging current transmitted by the BMS and control the bi-directional DC/DC converter based on the first discharging current to discharge a battery capacity of the battery to the energy storage battery, where the first discharging current is a discharging current transmitted by the BMS when a first accumulative charging amount of the battery is greater than or equal to a first accumulative charging amount threshold and a voltage of a battery cell of the battery does not exceed a full-charging voltage of the battery cell; and receive a second charging current transmitted by the BMS and control the bi-directional DC/DC converter based on the second charging current to charge the battery through the energy storage battery, where the second charging current is a charging current transmitted by the BMS when a first accumulative discharging amount of the battery is greater than or equal to a first accumulative discharging amount threshold.

Optionally, the control unit is further configured to: receive a second discharging current transmitted by the BMS and controlling the bi-directional DC/DC converter based on the second discharging current to discharge the battery capacity of the battery to the energy storage battery, where the second discharging current is a discharging current transmitted by the BMS when a second accumulative charging amount of the battery is greater than or equal to a second accumulative charging amount threshold and a voltage of a battery cell of the battery does not exceed a full-charging voltage of the battery cell.

Optionally, the control unit is further configured to: determine according to the first discharging current that a discharging demand power of the battery is smaller than a discharging power threshold; and control the bi-directional DC/DC converter to discharge the battery capacity of the battery to the energy storage battery.

Optionally, the control unit is further configured to: determine according to the first discharging current that a discharging demand power of the battery is greater than or equal to a discharging power threshold; and control the bi-directional DC/DC converter to discharge a battery capacity of a first discharging demand power to the energy storage battery and controlling the bi-directional DC/DC converter to discharge a battery capacity of a second discharging demand power to a power grid through a second charging and discharging apparatus, where the sum of the first discharging demand power and the second discharging demand power is equal to the discharging demand power.

Optionally, the control unit is further configured to: obtain a state of charge (SOC) of the energy storage battery; and determine that the SOC is greater than or equal to a SOC threshold and control the bi-directional DC/DC converter based on the first charging current to charge the battery through the energy storage battery;

Optionally, the control unit is further configured to: obtain a state of charge (SOC) of the energy storage battery; and the control unit is specifically configured to: determine that the SOC is smaller than a SOC threshold; transmit a charging request message to the second charging and discharging apparatus to enable the second charging and discharging apparatus to charge the energy storage battery through the power grid; and determine that the SOC is greater than or equal to the SOC threshold and control the bi-directional DC/DC converter based on the first charging current to charge the battery through the energy storage battery.

Optionally, the control unit is further configured to: receive a charging stop command transmitted by the BMS and stop charging the battery, where the charging stop command is a command transmitted by the BMS when a voltage of a battery cell of the battery exceeds a full-charging voltage of the battery cell.

Optionally, a charging rate of the first charging current and/or the second charging current ranges between 2C and 10C.

Optionally, a discharging rate of the first discharging current ranges between 0.1C and 1C.

Optionally, a ratio of the first accumulative discharging amount threshold to the first accumulative charging amount threshold is smaller than or equal to 10%.

Optionally, at least one of the first charging current, the first discharging current and the second charging current is determined and obtained by the BMS according to a state parameter of the battery; where the state parameter of the battery includes at least one of a battery temperature, a battery voltage, a battery current, a state of charge of the battery and a battery health state.

Optionally, the control unit is specifically configured to: regularly receive the first charging current transmitted by the BMS; and/or regularly receive the first discharging current transmitted by the BMS; and/or regularly receive the second charging current transmitted by the BMS.

Optionally, the control unit is further configured to: receive a first charging voltage transmitted by the BMS, where the first charging voltage and the first charging current are carried in a first battery charging demand (BLC) message; and/or receive a first discharging voltage transmitted by the BMS, where the first discharging voltage and the first discharging current are carried in a second BLC message; and/or receive a second charging voltage transmitted by the BMS, where the second charging voltage and the second charging current are carried in a third BLC message.

Figure 17:
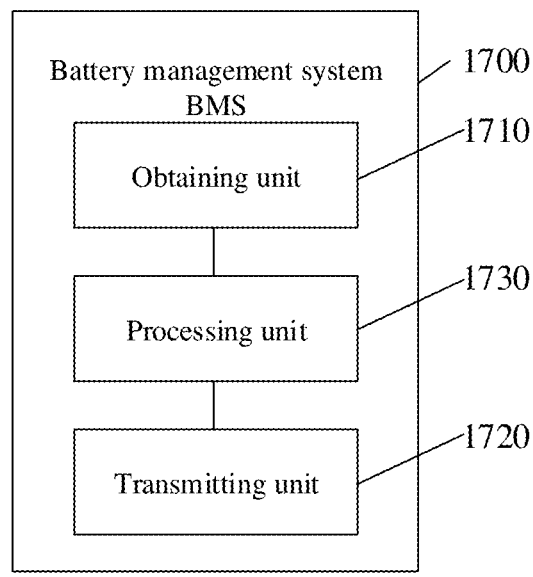
FIG. 17 is a schematic structural block diagram of a battery management system (BMS) provided by embodiments of the present application.

FIG. 17 shows a schematic structural block diagram of a battery management system (BMS) 1700 in one embodiment of the present application. As shown in FIG. 17, the BMS 1700 includes an obtaining unit 1710, a transmitting unit 1720 and a processing unit 1630.

In one embodiment of the present application, the obtaining unit is configured to obtain a first charging current; the transmitting unit is configured to transmit the first charging current to a charging and discharging apparatus to enable the charging and discharging apparatus to charge a battery based on the first charging current; and the processing unit is configured to determine that the obtaining unit is further configured to obtain a first discharging current when a first accumulative charging amount of the battery is greater than or equal to a first accumulative charging amount threshold and a voltage of a battery cell of the battery does not exceed a full-charging voltage of the battery cell; and the transmitting unit is further configured to transmit the first discharging current to the charging and discharging apparatus to enable the charging and discharging apparatus to control discharging of the battery based on the first discharging current. Optionally, the processing unit is further configured to determine that the obtaining unit is further configured to obtaining a second charging current when a first accumulative discharging amount of the battery is greater than or equal to a first accumulative discharging amount threshold. The transmitting unit is further configured to transmit the second charging current to the charging and discharging apparatus to enable the charging and discharging apparatus to charge the battery based on the second charging current.

Optionally, the processing unit is further configured to determine that the obtaining unit is further configured to obtain a second discharging current when a second accumulative charging amount of the battery is greater than or equal to a second accumulative charging amount threshold and a voltage of a battery cell of the battery does not exceed a full-charging voltage of the battery cell. The transmitting unit is further configured to transmit the second discharging current to the charging and discharging apparatus to enable the charging and discharging apparatus to control discharging of the battery based on the second discharging current.

Optionally, the processing unit is further configured to determine that the transmitting unit is further configured to transmit a charging stop command to the charging and discharging apparatus when a voltage of a battery cell of the battery exceeds a full-charging voltage of the battery cell, where the charging stop command is used to indicate the charging and discharging apparatus to stop charging the battery.

Optionally, a charging rate of the first charging current and/or the second charging current ranges between 2C and 10C.

Optionally, a discharging rate of the first discharging current and/or the second discharging current ranges between 0.1C and 1C.

Optionally, a ratio of the first accumulative discharging amount threshold to the first accumulative charging amount threshold is smaller than or equal to 10%, and/or a ratio of the second accumulative discharging amount threshold to the second accumulative charging amount threshold is smaller than or equal to 10%.

Optionally, the obtaining unit is configured to obtain a state parameter of the battery and according to the state parameter, determine a first charging current; and/or the obtaining unit is configured to obtain a state parameter of the battery and according to the state parameter, determine a first discharging current; and/or the obtaining unit is configured to obtaining a state parameter of the battery and according to the state parameter, determine a first discharging current; where the state parameter of the battery includes at least one of a battery temperature, a battery voltage, a battery current, a state of charge of the battery and a battery health state.

Optionally, the obtaining unit is configured to regularly obtain a first charging current and the transmitting unit is configured to regularly transmit the first charging current to the charging and discharging apparatus; and/or the obtaining unit is configured to regularly obtain a first discharging current and the transmitting unit is configured to regularly transmit the first discharging current to the charging and discharging apparatus; and/or the obtaining unit is configured to regularly obtain a second charging current and the transmitting unit is configured to regularly transmit the second charging current to the charging and discharging apparatus.

Optionally, the obtaining unit is further configured to obtain a first charging voltage and the transmitting unit is further configured to transmit the first charging voltage to the charging and discharging apparatus, where the first charging current and the first charging voltage are carried in a first battery charging demand (BLC) message; and/or the obtaining unit is further configured to obtain a first discharging voltage and the transmitting unit is further configured to transmit the first discharging voltage to the charging and discharging apparatus, where the first discharging current and the first discharging voltage are carried in a second BLC message; and/or the obtaining unit is further configured to obtain a second charging voltage and the transmitting unit is further configured to transmit the second charging voltage to the charging and discharging apparatus, where the second charging current and the second charging voltage are carried in a third BLC message; and/or the obtaining unit is further configured to obtain a second discharging voltage and the transmitting unit is further configured to transmit the second discharging voltage to the charging and discharging apparatus, where the second discharging current and the second discharging voltage are carried in a fourth BLC message.

Figure 18:
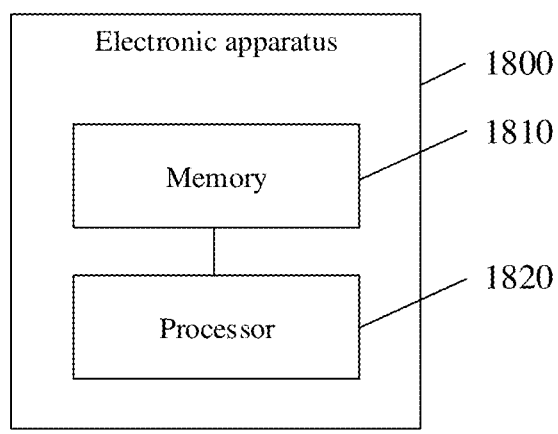
FIG. 18 is a schematic structural block diagram of an electronic apparatus in one embodiment of the present application.

FIG. 18 shows a schematic structural block diagram of an electronic apparatus 1800 in one embodiment of the present application. As shown in FIG. 18, the electronic apparatus 1800 includes a memory 1810 and a processor 1820, where the memory 1810 is configured to store a computer program and the processor 1820 is configured to read the computer program and performing the method in above various embodiments of the present application based on the computer program.

Optionally, the electronic apparatus 1800 can be used for any one or more of the BMS and the charging and discharging apparatus. In embodiments of the present application, in addition to the processor in the charging and discharging apparatus for reading a corresponding computer program and performing the charging method corresponding to the charging and discharging apparatus in above various embodiments based on the computer program, the processor in the BMS can also read a corresponding computer program and perform a charging method corresponding to the BMS in above various embodiments based on the computer program.

In addition, embodiments of the present application further provide a readable storage medium for storing a computer program, the computer program being configured to perform the method in the above various embodiments of the present application. Optionally, the computer program can be a computer program in the charging and discharging apparatus and/or the BMS.

It should be understood that, the specific examples herein are merely intended to help a person skilled in the art understand embodiments of the present application better, but not to limit the scope of embodiments of the present application.

It should be further understood that, in the embodiments of the present application, sequence numbers of the foregoing processes do not mean execution sequences. The execution sequences of the processes should be determined according to functions and internal logic of the processes, and should not be construed as any limitation on the implementation processes of the embodiments of the present application.

It should be further understood that various implementations described in the description can both be implemented separately or in combination, which are not limited herein by embodiments of the present application.

Although the present application has been described with reference to preferred embodiments, various improvements can be made thereto and equivalents can be used for replacement of members therein without departing from the scope of the present application. In particular, as long as a structural conflict does not exist, each technical feature mentioned in each embodiment can be combined in any manner. The present application is not restricted to particular embodiments disclosed herein, but to include all technical solutions falling in the scope of the claims.

What is claimed is:

1. A charging and discharging apparatus, comprising a bi-directional DC/DC converter and a control unit;
   wherein the control unit is configured to:
   receive a first charging current value transmitted by a battery management system (BMS) of a battery and control the bi-directional DC/DC converter based on the first charging current value to charge the battery through an energy storage battery;
   receive a first discharging current value transmitted by the BMS and control the bi-directional DC/DC converter based on the first discharging current value to discharge a battery capacity of the battery to the energy storage battery, wherein the first discharging current value is a discharging current value transmitted by the BMS when a first accumulative charging amount of the battery is greater than or equal to a first accumulative charging amount threshold and a voltage of a battery cell of the battery does not exceed a full-charging voltage of the battery cell; and
   receive a second charging current value transmitted by the BMS and control the bi-directional DC/DC converter based on the second charging current value to charge the battery through the energy storage battery, wherein the second charging current value is a charging current value transmitted by the BMS when a first accumulative discharging amount of the battery is greater than or equal to a first accumulative discharging amount threshold;

the control unit is further configured to:

determine according to the first discharging current value that a discharging demand power of the battery is greater than or equal to a discharging power threshold; and control the bi-directional DC/DC converter to discharge a battery capacity of the battery corresponding to a first discharging demand power to the energy storage battery and control the bi-directional DC/DC converter to discharge a battery capacity of the battery corresponding to a second discharging demand power to a power grid through a second charging and discharging apparatus, wherein the sum of the first discharging demand power and the second discharging demand power is equal to the discharging demand power.

2. The charging and discharging apparatus according to claim 1, wherein the control unit is further configured to:

receive a second discharging current value transmitted by the BMS and control the bi-directional DC/DC converter based on the second discharging current to discharge the battery capacity of the battery to the energy storage battery, wherein the second discharging current value is a discharging current value transmitted by the BMS when a second accumulative charging amount of the battery is greater than or equal to a second accumulative charging amount threshold and a voltage of a battery cell of the battery does not exceed a full-charging voltage of the battery cell.

3. The charging and discharging apparatus according to claim 1, wherein the control unit is further configured to:

determine according to the first discharging current value that a discharging demand power of the battery is smaller than a discharging power threshold; and control the bi-directional DC/DC converter to discharge the battery capacity of the battery to the energy storage battery.

4. The charging and discharging apparatus according to claim 1, wherein the control unit is further configured to:

obtain a state of charge (SOC) of the energy storage battery; and determine that the SOC is greater than or equal to a SOC threshold and control the bi-directional DC/DC converter based on the first charging current value to charge the battery through the energy storage battery.

5. The charging and discharging apparatus according to claim 1, wherein the control unit is further configured to:

obtain a state of charge (SOC) of the energy storage battery; and wherein the control unit is specifically configured to:

determine that the SOC is smaller than a SOC threshold;

transmit a charging request message to the second charging and discharging apparatus to enable the second charging and discharging apparatus to charge the energy storage battery through the power grid; and determine that the SOC is greater than or equal to the SOC threshold and control the bi-directional DC/DC converter based on the first charging current value to charge the battery through the energy storage battery.

6. The charging and discharging apparatus according to claim 1, wherein the control unit is further configured to:

receive a charging stop command transmitted by the BMS and stop charging the battery, wherein the charging stop command is a command transmitted by the BMS when a voltage of a battery cell of the battery exceeds a full-charging voltage of the battery cell.

7. The charging and discharging apparatus according to claim 1, wherein at least one of the first charging current value, the first discharging current value and the second charging current value is determined and obtained by the BMS according to a state parameter of the battery;

wherein the state parameter of the battery comprises at least one of a battery temperature, a battery voltage, a battery current, a state of charge of the battery and a battery health state.

8. The charging and discharging apparatus according to claim 1, wherein the control unit is specifically configured to:

regularly receive the first charging current value transmitted by the BMS; and/or regularly receive the first discharging current value transmitted by the BMS; and/or regularly receive the second charging current value transmitted by the BMS.

9. The charging and discharging apparatus according to claim 1, wherein the control unit is further configured to:

receive a first charging voltage value transmitted by the BMS, wherein the first charging voltage value and the first charging current value are carried in a first battery charging demand message; and/or receive a first discharging voltage value transmitted by the BMS, wherein the first discharging voltage value and the first discharging current value are carried in a second battery charging demand message; and/or receive a second charging voltage value transmitted by the BMS, wherein the second charging voltage value and the second charging current are carried in a third battery charging demand message.

10. A battery charging method, being applied to a charging and discharging apparatus, the method comprising:

receiving, by the charging and discharging apparatus, a first charging current value transmitted by a battery management system (BMS) of a battery and controlling a bi-directional DC/DC converter of the charging and discharging apparatus based on the first charging current value to charge the battery through an energy storage battery;

receiving, by the charging and discharging apparatus, a first discharging current value transmitted by the BMS and controlling the bi-directional DC/DC converter based on the first discharging current value to discharge a battery capacity of the battery to the energy storage battery, wherein the first discharging current value is a discharging current transmitted by the BMS when a first accumulative charging amount of the battery is greater than or equal to a first accumulative charging amount threshold and a voltage of a battery cell of the battery does not exceed a full-charging voltage of the battery cell; and receiving, by the charging and discharging apparatus, a second charging current value transmitted by the BMS and controlling the bi-directional DC/DC converter based on the second charging current value to charge the battery through the energy storage battery, wherein the second charging current value is a charging current transmitted by the BMS when a first accumulative discharging amount of the battery is greater than or equal to a first accumulative discharging amount threshold;

wherein the receiving, by the charging and discharging apparatus, a first discharging current value transmitted by the BMS and controlling the bi-directional DC/DC converter based on the first discharging current value to discharge a battery capacity of the battery to the energy storage battery comprises:
  determining, by the charging and discharging apparatus and according to the first discharging current value that a discharging demand power of the battery is greater than or equal to a discharging power threshold; and
  controlling, by the charging and discharging apparatus, the bi-directional DC/DC converter to discharge a battery capacity of the battery corresponding to a first discharging demand power to the energy storage battery and to discharge a battery capacity of the battery corresponding to a second discharging demand power to a power grid through a second charging and discharging apparatus, wherein the sum of the first discharging demand power and the second discharging demand power is equal to the discharging demand power.

11. The method according to claim 10, wherein the method further comprises:
  receiving, by the charging and discharging apparatus, a second discharging current value transmitted by the BMS and controlling the bi-directional DC/DC converter based on the second discharging current value to discharge the battery capacity of the battery to the energy storage battery, wherein the second discharging current value is a discharging current transmitted by the BMS when a second accumulative charging amount of the battery is greater than or equal to a second accumulative charging amount threshold and a voltage of a battery cell of the battery does not exceed a full-charging voltage of the battery cell.

12. The method according to claim 10, wherein the receiving, by the charging and discharging apparatus, a first discharging current value transmitted by the BMS and controlling the bi-directional DC/DC converter based on the first discharging current value to discharge a battery capacity of the battery to the energy storage battery comprises:
  determining, by the charging and discharging apparatus and according to the first discharging current value that a discharging demand power of the battery is smaller than a discharging power threshold; and
  controlling, by the charging and discharging apparatus, the bi-directional DC/DC converter to discharge the battery capacity of the battery to the energy storage battery.

13. The method according to claim 10, wherein the method further comprises:
  obtaining, by the charging and discharging apparatus, a state of charge (SOC) of the energy storage battery; and
  the controlling the bi-directional DC/DC converter of the charging and discharging apparatus based on the first charging current value to charge the battery through an energy storage battery comprises:
  determining, by the charging and discharging apparatus, that the SOC is greater than or equal to the SOC threshold and controlling the bi-directional DC/DC converter based on the first charging current to charge the battery through the energy storage battery.

14. The method according to claim 10, wherein the method further comprises:
  obtaining, by the charging and discharging apparatus, a state of charge (SOC) of the energy storage battery; and
  the controlling the bi-directional DC/DC converter of the charging and discharging apparatus based on the first charging current value to charge the battery through an energy storage battery comprises:
  determining, by the charging and discharging apparatus, that the SOC is smaller than the SOC threshold;
  transmitting, by the charging and discharging apparatus, a charging request message to the second charging and discharging apparatus to enable the second charging and discharging apparatus to charge the energy storage battery through the power grid;
  determining, by the charging and discharging apparatus, that the SOC is greater than or equal to the SOC threshold and controlling the bi-directional DC/DC converter based on the first charging current to charge the battery through the energy storage battery.

15. The method according to claim 10, wherein the method further comprises:
  receiving, by the charging and discharging apparatus, a charging stop command transmitted by the BMS and stopping charging the battery, wherein the charging stop command is a command transmitted by the BMS when a voltage of a battery cell of the battery exceeds a full-charging voltage of the battery cell.

16. The method according to claim 10, wherein the receiving, by the charging and discharging apparatus, a first charging current transmitted by a BMS comprises:
  regularly receiving, by the charging and discharging apparatus, the first charging current value transmitted by the BMS; and/or
  the receiving, by the charging and discharging apparatus, a first discharging current value transmitted by the BMS comprises:
  regularly receiving, by the charging and discharging apparatus, the first discharging current value transmitted by the BMS; and/or
  the receiving, by the charging and discharging apparatus, a second charging current value transmitted by the BMS comprises:
  regularly receiving, by the charging and discharging apparatus, a second charging current value transmitted by the BMS.

17. The method according to claim 10, wherein the method further comprises: receiving, by the charging and discharging apparatus, a first charging voltage value transmitted by the BMS, wherein the first charging voltage value and the first charging current value are carried in a first battery charging demand message; and/or
  the method further comprises: receiving, by the charging and discharging apparatus, a first discharging voltage value transmitted by the BMS, wherein the first discharging voltage value and the first discharging current value are carried in a second battery charging demand message; and/or
  the method further comprises: receiving, by the charging and discharging apparatus, a second charging voltage value transmitted by the BMS, wherein the second charging voltage value and the second charging current value are carried in a third battery charging demand message.

18. A charging and discharging apparatus, comprising a processor and a memory, wherein the memory is configured to store a computer program, and the processor is configured to call the computer program to perform a battery charging method, wherein the method comprising:
  receiving, by the charging and discharging apparatus, a first charging current value transmitted by a battery management system (BMS) of a battery and controlling a bi-directional DC/DC converter of the charging and discharging apparatus based on the first charging current value to charge the battery through an energy storage battery;

receiving, by the charging and discharging apparatus, a first discharging current value transmitted by the BMS and controlling the bi-directional DC/DC converter based on the first discharging current value to discharge a battery capacity of the battery to the energy storage battery, wherein the first discharging current value is a discharging current transmitted by the BMS when a first accumulative charging amount of the battery is greater than or equal to a first accumulative charging amount threshold and a voltage of a battery cell of the battery does not exceed a full-charging voltage of the battery cell; and receiving, by the charging and discharging apparatus, a second charging current value transmitted by the BMS and controlling the bi-directional DC/DC converter based on the second charging current value to charge the battery through the energy storage battery, wherein the second charging current value is a charging current transmitted by the BMS when a first accumulative discharging amount of the battery is greater than or equal to a first accumulative discharging amount threshold;

wherein the receiving, by the charging and discharging apparatus, a first discharging current value transmitted by the BMS and controlling the bi-directional DC/DC converter based on the first discharging current value to discharge a battery capacity of the battery to the energy storage battery comprises:

determining, by the charging and discharging apparatus and according to the first discharging current value that a discharging demand power of the battery is greater than or equal to a discharging power threshold; and controlling, by the charging and discharging apparatus, the bi-directional DC/DC converter to discharge a battery capacity of the battery corresponding to a first discharging demand power to the energy storage battery and to discharge a battery capacity of the battery corresponding to a second discharging demand power to a power grid through a second charging and discharging apparatus, wherein the sum of the first discharging demand power and the second discharging demand power is equal to the discharging demand power.

* * * * *